United States Patent
Smith et al.

(10) Patent No.: US 11,856,288 B2
(45) Date of Patent: Dec. 26, 2023

(54) REQUEST QUEUE FOR SHARED CONTROL OF CAMERA DEVICE BY MULTIPLE DEVICES

(71) Applicant: Snap Inc., Santa Monica, CA (US)

(72) Inventors: Brian Anthony Smith, Brentwood, NY (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/165,777

(22) Filed: Feb. 7, 2023

(65) Prior Publication Data

US 2023/0188837 A1    Jun. 15, 2023

Related U.S. Application Data

(63) Continuation of application No. 17/679,616, filed on Feb. 24, 2022, now Pat. No. 11,606,491, which is a continuation of application No. 17/125,298, filed on Dec. 17, 2020, now Pat. No. 11,290,632, which is a continuation of application No. 16/443,614, filed on Jun. 17, 2019, now Pat. No. 10,897,564.

(51) Int. Cl.
*H04N 23/661* (2023.01)
*H04L 65/1069* (2022.01)
*H04N 1/00* (2006.01)

(52) U.S. Cl.
CPC ....... *H04N 23/661* (2023.01); *H04L 65/1069* (2013.01); *H04N 1/00095* (2013.01); *H04N 2201/0084* (2013.01)

(58) Field of Classification Search
CPC .................................................... H04N 23/661
USPC ..................................................... 348/207.11
See application file for complete search history.

(56) References Cited

U.S. PATENT DOCUMENTS

| 10,353,532 | B1 | 7/2019 | Holz et al. |
| 10,897,564 | B1 | 1/2021 | Smith et al. |
| 11,064,113 | B1 | 7/2021 | Weber et al. |

(Continued)

FOREIGN PATENT DOCUMENTS

| CN | 101256597 A | 9/2008 |
| CN | 115668102 | 1/2023 |

(Continued)

OTHER PUBLICATIONS

"U.S. Appl. No. 16/443,614, Non Final Office Action dated Jun. 2, 2020", 7 pgs.

(Continued)

*Primary Examiner* — Joel W Fosselman
(74) *Attorney, Agent, or Firm* — Schwegman Lundberg & Woessner, P.A.

(57) ABSTRACT

Aspects of the present disclosure involve a system comprising a computer-readable storage medium storing at least one program, method, and user interface to facilitate a camera sharing session between two or more users. A camera sharing session is initiated based on session configuration information comprising a user identifier of a user permitted to control image capturing at a camera communicatively coupled to a first device. A trigger request is received from the second device and in response, an image capture, which results in at least one image, is triggered at the camera and the image is transmitted to the second device.

20 Claims, 20 Drawing Sheets

(56) References Cited

U.S. PATENT DOCUMENTS

| | | | |
|---|---|---|---|
| 11,290,632 | B2 | 3/2022 | Smith et al. |
| 11,340,857 | B1 | 5/2022 | Smith et al. |
| 11,593,997 | B2 | 2/2023 | Smith et al. |
| 11,606,491 | B2 | 3/2023 | Smith et al. |
| 2006/0170652 | A1 | 8/2006 | Bannai et al. |
| 2007/0024527 | A1 | 2/2007 | Heikkinen et al. |
| 2008/0034040 | A1 | 2/2008 | Wherry et al. |
| 2009/0237328 | A1 | 9/2009 | Gyorfi et al. |
| 2011/0161507 | A1 | 6/2011 | Osullivan et al. |
| 2012/0081393 | A1 | 4/2012 | Kim |
| 2012/0198531 | A1 | 8/2012 | Ort et al. |
| 2012/0249741 | A1 | 10/2012 | Maciocci et al. |
| 2013/0178257 | A1 | 7/2013 | Langseth |
| 2013/0293468 | A1 | 11/2013 | Perez et al. |
| 2014/0132630 | A1 | 5/2014 | Mun et al. |
| 2014/0372540 | A1 | 12/2014 | Libin |
| 2016/0100034 | A1 | 4/2016 | Miller |
| 2016/0133230 | A1 | 5/2016 | Daniels et al. |
| 2016/0217623 | A1 | 7/2016 | Singh |
| 2016/0260256 | A1 | 9/2016 | Shefi |
| 2017/0160815 | A1 | 6/2017 | Glazier et al. |
| 2018/0205797 | A1 | 7/2018 | Faulkner |
| 2018/0295271 | A1* | 10/2018 | Kim ............... H04N 23/695 |
| 2018/0322706 | A1 | 11/2018 | Drouin et al. |
| 2019/0068390 | A1 | 2/2019 | Gross et al. |
| 2019/0107990 | A1 | 4/2019 | Spivack et al. |
| 2019/0318540 | A1 | 10/2019 | Piemonte et al. |
| 2019/0391724 | A1 | 12/2019 | Holz et al. |
| 2020/0045519 | A1 | 2/2020 | Raleigh et al. |
| 2020/0244711 | A1 | 7/2020 | Engel et al. |
| 2020/0371673 | A1 | 11/2020 | Faulkner |
| 2021/0105397 | A1 | 4/2021 | Smith et al. |
| 2021/0304450 | A1 | 9/2021 | Smith et al. |
| 2021/0304507 | A1 | 9/2021 | Smith et al. |
| 2021/0306386 | A1 | 9/2021 | Smith et al. |
| 2021/0306387 | A1 | 9/2021 | Smith et al. |
| 2022/0182530 | A1 | 6/2022 | Smith et al. |
| 2022/0214856 | A1 | 7/2022 | Smith et al. |
| 2023/0177786 | A1 | 6/2023 | Smith et al. |

FOREIGN PATENT DOCUMENTS

| | | |
|---|---|---|
| CN | 115668891 | 1/2023 |
| CN | 115668897 | 1/2023 |
| CN | 115698908 | 2/2023 |
| KR | 102515040 | 3/2023 |
| WO | WO-2016103115 A1 | 6/2016 |
| WO | WO-2019055703 A2 | 3/2019 |
| WO | WO-2021195100 A1 | 9/2021 |
| WO | WO-2021195125 A1 | 9/2021 |
| WO | WO-2021195233 A1 | 9/2021 |
| WO | WO-2021202241 A1 | 10/2021 |

OTHER PUBLICATIONS

"U.S. Appl. No. 16/443,614, Notice of Allowance dated Sep. 14, 2020", 8 pgs.

"U.S. Appl. No. 16/443,614, Notice of Allowance dated Sep. 23, 2020", 5 pgs.

"U.S. Appl. No. 16/443,614, Response filed Aug. 24, 2020 to Non Final Office Action dated Jun. 2, 2020", 9 pgs.

"U.S. Appl. No. 16/947,083, 312 Amendment filed Apr. 14, 2022", 7 pgs.

"U.S. Appl. No. 16/947,083, Corrected Notice of Allowability dated Apr. 26, 2022", 3 pgs.

"U.S. Appl. No. 16/947,083, Examiner Interview Summary dated Nov. 8, 2021", 2 pgs.

"U.S. Appl. No. 16/947,083, Final Office Action dated Aug. 6, 2021", 29 pgs.

"U.S. Appl. No. 16/947,083, Non Final Office Action dated Mar. 19, 2021", 26 pgs.

"U.S. Appl. No. 16/947,083, Notice of Allowance dated Jan. 21, 2022", 12 pgs.

"U.S. Appl. No. 16/947,083, Response filed Jul. 13, 2021 to Non Final Office Action dated Mar. 19, 2021", 11 pgs.

"U.S. Appl. No. 16/947,083, Response filed Nov. 8, 2021 to Final Office Action dated Aug. 6, 2021", 12 pgs.

"U.S. Appl. No. 17/125,298, Non Final Office Action dated Aug. 16, 2021", 8 pgs.

"U.S. Appl. No. 17/125,298, Notice of Allowance dated Nov. 26, 2021", 8 pgs.

"U.S. Appl. No. 17/125,298, Response filed Nov. 9, 2021 to Non Final Office Action dated Aug. 16, 2021", 8 pgs.

"U.S. Appl. No. 17/206,991, Non Final Office Action dated Oct. 20, 2022", 13 pgs.

"U.S. Appl. No. 17/206,991, Response filed Jan. 18, 2023 to Non Final Office Action dated Oct. 20, 2022", 12 pgs.

"U.S. Appl. No. 17/207,080, Non Final Office Action dated Oct. 6, 2022", 9 pgs.

"U.S. Appl. No. 17/207,080, Response filed Jan. 5, 2023 to Non Final Office Action dated Oct. 6, 2022", 11 pgs.

"U.S. Appl. No. 17/207,174, Non Final Office Action dated Oct. 6, 2022", 15 pgs.

"U.S. Appl. No. 17/207,174, Response filed Jan. 5, 2023 to Non Final Office Action dated Oct. 6, 2022", 10 pgs.

"U.S. Appl. No. 17/210,291, 312 Amendment filed Jan. 9, 2023", 9 pgs.

"U.S. Appl. No. 17/210,291, Corrected Notice of Allowability dated Oct. 26, 2022", 2 pgs.

"U.S. Appl. No. 17/210,291, Examiner Interview Summary dated Dec. 27, 2021", 3 pgs.

"U.S. Appl. No. 17/210,291, Final Office Action dated Feb. 2, 2022", 51 pgs.

"U.S. Appl. No. 17/210,291, Non Final Office Action dated May 13, 2022", 50 pgs.

"U.S. Appl. No. 17/210,291, Non Final Office Action dated Sep. 22, 2021", 37 pgs.

"U.S. Appl. No. 17/210,291, Notice of Allowance dated Oct. 19, 2022", 8 pgs.

"U.S. Appl. No. 17/210,291, Response filed May 2, 2022 to Final Office Action dated Feb. 2, 2022", 11 pgs.

"U.S. Appl. No. 17/210,291, Response filed Sep. 13, 2022 to Non Final Office Action dated May 13, 2022", 11 pgs.

"U.S. Appl. No. 17/210,291, Response filed Dec. 22, 2021 to Non Final Office Action dated Sep. 22, 2021", 12 pgs.

"U.S. Appl. No. 17/210,291, Supplemental Notice of Allowability dated Jan. 19, 2023", 11 pgs.

"U.S. Appl. No. 17/679,616, Notice of Allowance dated Nov. 7, 2022", 9 pgs.

"European Application Serial No. 21779785.1, Response Filed Dec. 2, 2022 to Communication pursuant to Rules 161(2) and 162 EPC dated Nov. 9, 2023", 25 pgs.

"International Application Serial No. PCT/US2021/023712, International Preliminary Report on Patentability dated Oct. 6, 2022", 8 pgs.

"International Application Serial No. PCT/US2021/023712, International Search Report dated Jun. 29, 2021", 4 pgs.

"International Application Serial No. PCT/US2021/023712, Written Opinion dated Jun. 29, 2021", 6 pgs.

"International Application Serial No. PCT/US2021/023748, International Preliminary Report on Patentability dated Oct. 6, 2022", 8 pgs.

"International Application Serial No. PCT/US2021/023748, International Search Report dated Jun. 29, 2021", 4 pgs.

"International Application Serial No. PCT/US2021/023748, Written Opinion dated Jun. 29, 2021", 6 pgs.

"International Application Serial No. PCT/US2021/023918, International Preliminary Report on Patentability dated Oct. 6, 2022", 9 pgs.

"International Application Serial No. PCT/US2021/023918, International Search Report dated Jun. 28, 2021", 4 pgs.

"International Application Serial No. PCT/US2021/023918, Written Opinion dated Jun. 28, 2021", 7 pgs.

"International Application Serial No. PCT/US2021/024180, International Preliminary Report on Patentability dated Oct. 13, 2022", 6 pgs.

(56) References Cited

OTHER PUBLICATIONS

"International Application Serial No. PCT/US2021/024180, International Search Report dated Jul. 6, 2021", 5 pgs.
"International Application Serial No. PCT/US2021/024180, Written Opinion dated Jul. 6, 2021", 4 pgs.
Payette, Chuck, et al., "Enabling reliable and efficient wireless video uplink", Bell Labs Technical Journal, Wiley, CA, US, vol. 16, No. 2, (Sep. 1, 2011), 169-191.
"U.S. Appl. No. 17/679,616, Corrected Notice of Allowability dated Feb. 15, 2023", 2 pgs.
"U.S. Appl. No. 17/206,991, Final Office Action dated Feb. 16, 2023", 14 pgs.
"U.S. Appl. No. 17/206,991, Examiner Interview Summary dated Feb. 22, 2023", 2 pgs.
"U.S. Appl. No. 17/703,567, Non Final Office Action dated Mar. 31, 2023", 13 pgs.
"U.S. Appl. No. 17/207,174, Final Office Action dated Apr. 27, 2023", 17 pgs.
"U.S. Appl. No. 17/207,080, Final Office Action dated Apr. 28, 2023", 11 pgs.
"U.S. Appl. No. 17/206,991, Response filed May 8, 2023 to Final Office Action dated Feb. 16, 2023", 13 pgs.
"U.S. Appl. No. 17/703,567, Response filed Jun. 14, 2023 to Non Final Office Action dated Mar. 31, 2023", 9 pgs.
"U.S. Appl. No. 17/206,991, Non Final Office Action dated Jun. 29, 2023", 21 pgs.
"U.S. Appl. No. 17/703,567, Notice of Allowance dated Jul. 13, 2023", 7 pgs.
"U.S. Appl. No. 18/163,098, Non Final Office Action dated Jul. 14, 2023", 26 pgs.

* cited by examiner

US 11,856,288 B2

REQUEST QUEUE FOR SHARED CONTROL OF CAMERA DEVICE BY MULTIPLE DEVICES

CROSS-REFERENCE TO RELATED APPLICATIONS

This application is a continuation of U.S. patent application Ser. No. 17/679,616, filed Feb. 24, 2022, which application is a continuation of U.S. patent application Ser. No. 17/125,298, filed Dec. 17, 2020, now issued as U.S. Pat. No. 11,290,632, which is a continuation of U.S. patent application Ser. No. 16/443,614, filed Jun. 17, 2019, now issued as U.S. patent Ser. No. 10/897,564, each of which are incorporated by reference herein in their entireties.

TECHNICAL FIELD

The present disclosure generally relates to mobile and wearable computing technology. In particular, example embodiments of the present disclosure address systems, methods, and user interfaces to facilitate shared control of a camera device by multiple devices over a network.

BACKGROUND

Many wearable and mobile devices such as "smart" glasses include an embedded camera. Users of these devices often stream video produced by an embedded camera to other users' devices using mobile device software applications and online platforms.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

Description

Figure 1:
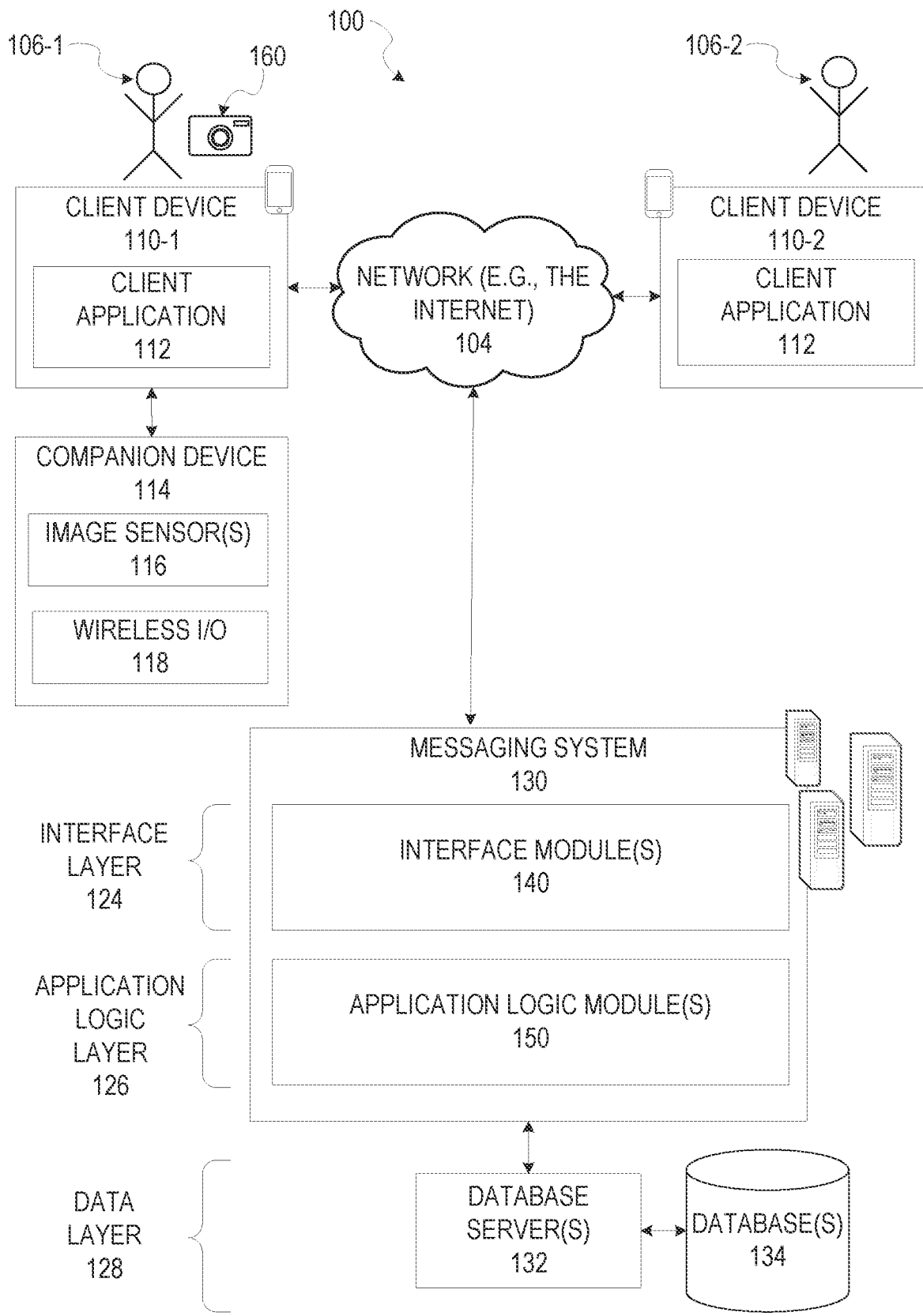
FIG. 1 is a system diagram illustrating an example communication system for facilitating a camera sharing session between two or more users, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As noted above, users of mobile and wearable devices often stream video produced by an embedded camera to other users' devices using mobile device software applications and online platforms. With traditional video streaming paradigms, a continuous video stream is provided by one device over a network to one or more other devices. However, traditional video streaming paradigms are problematic for wearable and mobile device implementations given the devices' hardware limitations. For example, these devices have limited space for circuitry and power and as a result, the continuous streaming of the video drains device batteries and heats up the devices' central processing unit (CPU), especially that of the device providing the continuous video stream for an extended duration. Moreover, the limited display screen space of wearable and mobile devices makes it challenging for users to meaningfully communicate and interact during a video streaming session. In addition, conventional video streaming applications and platforms typically require that a user's friends or followers be online to view content from a video streaming session.

Aspects of the present disclosure address the foregoing issues by improving upon traditional video streaming technology with systems, methods, techniques, instruction sequences, and computing machine program products for facilitating a camera sharing session between two or more users. During a camera sharing session, single frame images or short videos captured by a camera of a first user (e.g., an embedded camera of a mobile or wearable device) are sent to one or more other users' devices rather than provides those devices with a continuous stream of video content, as with traditional video streaming. Providing only single frame images or short videos rather than a continuous stream of video content during a camera sharing session results in a reduction of device power consumption and computational processing resource utilization compared to traditional video streaming.

Further, the second user can receive image data (single frame images or short videos) sent by the first user during a camera sharing session even if the second user is not online during the camera sharing session. Thus, camera sharing sessions, as set forth herein, further improve upon limitations of traditional video streaming technology.

In addition, the second user can remotely (e.g., from a distance) control image capturing functionality at the camera of the first user during the camera sharing session. Allowing the second user to control the camera of the first user during the camera sharing session increases the interactivity and engagement of users that is lacking in traditional video streaming paradigms.

Consistent with some embodiments, a method may include initiating a camera sharing session based on session configuration information. The session configuration information comprises a user identifier corresponding to a user permitted to control, during the camera sharing session, image capturing at a camera communicatively coupled to a first device. The initiating of the camera sharing session may comprise transmitting, to a second device associated with the user, an invitation to join the camera sharing session. Based on an indication of the user joining the camera sharing session, a first image capture may be triggered at the camera resulting in first image data comprising at least a first image. A first message comprising the first image data is transmitted to the second device. A trigger request is received from the second device and in response, a second image capture is triggered at the camera resulting in second image data comprising at least a second image. A second message comprising the second image data is transmitted to the second device.

DRAWINGS

FIG. 1 is a system diagram illustrating an example communication system 100 for facilitating a camera sharing session between two or more users, according to some example embodiments. The communication system 100 may, for example, be a messaging system where clients communicate and exchange data within the communication system 100, where certain data is communicated to and from wearable devices described herein. The data may pertain to various functions (e.g., sending and receiving image content as well as text and other media communication) and aspects associated with the communication system 100 and its users. Although the communication system 100 is illustrated herein as having a client-server architecture, other embodiments may include other network architectures, such as peer-to-peer or distributed network environments.

As shown in FIG. 1, the communication system 100 includes a messaging system 130. The messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 14 represents a set of executable software instructions and the corresponding hardware (e.g., memory and processor) for executing the instructions. In various embodiments, additional functional modules and engines may be used with a messaging system, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although the messaging system 130 is depicted in FIG. 1 as having a three-tiered architecture, the inventive subject matter is by no means limited to such an architecture.

As shown in FIG. 1, the interface layer 124 consists of interface modules (e.g., a web server) 140, which receive requests from various client-devices and servers, such as client devices 110-1 and 110-2 executing client application 112. In response to received requests, the interface modules 140 communicate appropriate responses to requesting devices via a network 104. For example, the interface modules 140 can receive requests such as Hypertext Transfer Protocol (HTTP) requests or other web-based application programming interface (API) requests.

The client devices 110 can execute conventional web browser applications or applications (also referred to as "apps") that have been developed for a specific platform to include any of a wide variety of mobile devices and mobile-specific operating systems (e.g., IOS™, ANDROID™, WINDOWS® PHONE). In an example, the client devices 110 are executing the client application 112. The client application 112 can provide functionality to present information to users 106-1 and 106-2 and communicate via the network 104 to exchange information with the messaging system 130. Each of the client devices 110-1 and 110-2 can comprise a device that includes at least a display and communication capabilities with the network 104 to access the messaging system 130. The client devices 110 comprise, but are not limited to, remote devices, work stations, computers, general-purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network personal computers (PCs), mini-computers, and the like. The users 106-1 and 106-2 can include a person, a machine, or other means of interacting with the client devices 110. In some embodiments, the users 106-1 and 106-2 interact with the messaging system 130 via the client devices 110-1 and 110-2, respectively.

As shown, the communication system 100 additionally includes a companion device 114 communicatively connected to the client device 110-1. In various embodiments, the companion device 114 is configured for wired communication with either the client device 110-1 or the messaging system 130. The companion device 114 may also be simultaneously configured for wireless communication with the client device 110-1, the messaging system 130, or both. The companion device 114 may be a wearable device such as glasses, a visor, a watch, or other network-enabled items. The companion device 114 may also be any device described herein that accesses a network such as network via another device such as the client device 110-1.

The companion device 114 include image sensors 116 and wireless input and output (I/O) 118. The companion device 114 may include one or more processors, a display, a battery, and a memory, but may have limited processing and memory resources. In such embodiments, the client device 110-1 and/or server devices used for the messaging system 130 may be used via network connections to provide remote processing and memory resources for the companion devices 114. In one embodiment, for example, the client companion device 114 may be a pair of network-enabled glasses, such as glasses 231 of FIG. 2, and the client device 110-1 may be a smartphone that enables access to the messaging system 130 to enable communication of image content captured with the image sensor(s) 116.

As shown in FIG. 1, the data layer 128 has one or more database servers 132 that facilitate access to information storage repositories or databases 134. The databases 134 are storage devices that store data such as member profile data, social graph data (e.g., relationships between members of the messaging system 130), and other user data.

An individual can register with the messaging system 130 to become a member of the messaging system 130. Once registered, a member can form social network relationships (e.g., friends, followers, or contacts) on the messaging system 130 and interact with a broad range of applications provided by the messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the messaging system 130. For instance, a messaging application can be implemented with one or more of the application logic modules 150. The messaging application provides a messaging mechanism for users of the client devices 110-1 and 110-2 to send and receive messages that include text and media content such as pictures and video. The client devices 110-1 and 110-2 may access and view the messages from the messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient.

Additionally, the application logic modules 150 embodying the messaging application or other application logic modules 150 may provide functionality to facilitate a camera sharing session between the users 106-1 and 106-2. Within the context of a camera sharing session, the user 106-2 may control a camera 160 of the user 106-1. More specifically, the user 106-2 may utilize the client application 112 executing on the client device 110-2 to trigger image capturing at the camera 160. At each instance where the user 106-2 triggers an image capture at the camera 106, image data is generated and a message comprising the image data is transmitted to the client device 106-2. The message may further include audio data recorded in conjunction with the capturing of the image data. The image data may comprise as single image frame or a short video (e.g., comprising multiple image frames). By providing single frame images or short videos to the client device 106-2 during the camera sharing session, rather than a continuous stream of video content as done in traditional video streaming, the messaging system 130 reduces power consumption and use of computational processing resources at both the client devices 106-1 and 106-2, at least compared to traditional video streaming.

The camera 160 is communicatively coupled to the client device 110-1. For example, in some embodiments, the camera 160 may be embedded in the client device 110-1 (e.g., a smartphone with an embedded camera). In some embodiments, the camera 160 may be embedded in the companion device 114 and may comprise or correspond to the image sensor(s) 116.

Figure 2:
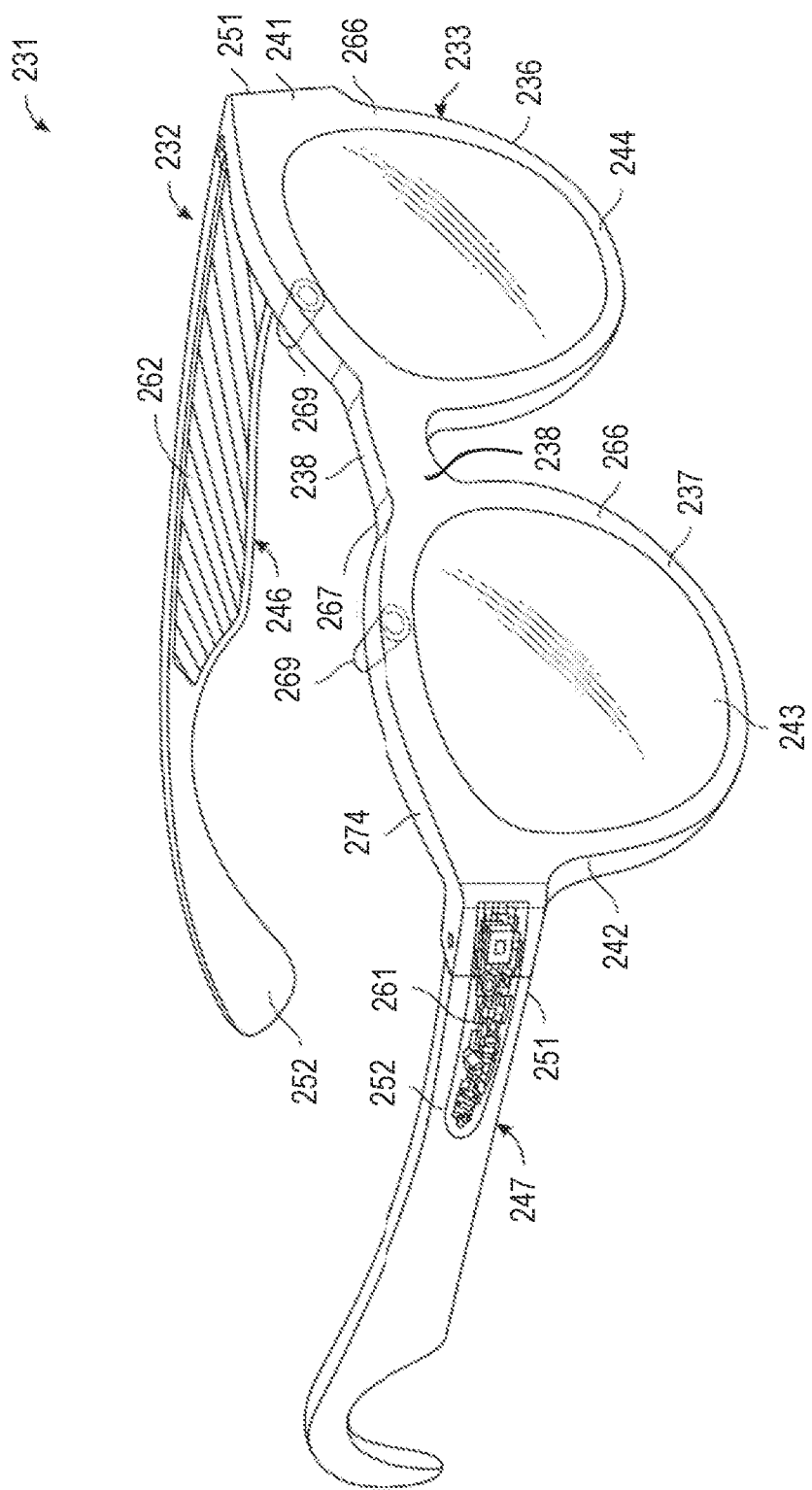
FIG. 2 is a diagram illustrating a wearable companion device for use in a camera sharing session, according to some example embodiments.

FIG. 2 is a diagram illustrating a wearable companion device 114 in the example form of glasses 231 for use in a camera sharing session, according to some example embodiments. The glasses 231 can include a frame 232 made from any suitable material such as plastic or metal, including any suitable shape memory alloy. The frame 232 can have a front piece 233 that can include a first or left lens, display, or optical element holder 236 and a second or right lens, display, or optical element holder 237 connected by a bridge 238. The front piece 233 additionally includes a left end portion 241 and a right end portion 242. A first or left optical element 244 and a second or right optical element 243 can be provided within respective left and right optical element holders 236, 237. Each of the optical elements 243, 244 can be a lens, a display, a display assembly, or a combination of the foregoing. In some embodiments, for example, the glasses 231 are provided with an integrated near-eye display mechanism that enables, for example, display to the user of preview images for visual media captured by cameras 269 of the glasses 231.

The frame 232 additionally includes a left arm or temple piece 246 and a right arm or temple piece 247 coupled to the respective left and right end portions 241, 242 of the front piece 233 by any suitable means, such as a hinge (not shown), so as to be coupled to the front piece 233, or rigidly or fixably secured to the front piece 233 so as to be integral with the front piece 33. Each of the temple pieces 246 and 247 can include a first portion 251 that is coupled to the respective end portion 241 or 242 of the front piece 233 and any suitable second portion 252, such as a curved or arcuate piece, for coupling to the ear of the user. In one embodiment, the front piece 233 can be formed from a single piece of material, so as to have a unitary or integral construction. In one embodiment, the entire frame can be formed from a single piece of material so as to have a unitary or integral construction.

The glasses 231 can include a device, such as a computer 261, which can be of any suitable type so as to be carried by the frame 232 and, in one embodiment, of a suitable size and shape so as to be at least partially disposed in one of the temple pieces 246 and 247. In one embodiment, the computer 261 has a size and shape similar to the size and shape of one of the temple pieces 246, 247 and is thus disposed almost entirely if not entirely within the structure and confines of such temple pieces 246 and 247. In one embodiment, the computer 261 can be disposed in both of the temple pieces 246, 247. The computer 261 can include one or more processors with memory, wireless communication circuitry, and a power source. The computer 261 comprises low-power circuitry, high-speed circuitry, and a display processor. Various other embodiments may include these elements in different configurations or integrated together in different ways.

The computer 261 additionally includes a battery 262 or other suitable portable power supply. In one embodiment, the battery 262 is disposed in one of the temple pieces 246 or 247. In the glasses 231 shown in FIG. 2, the battery 262 is shown as being disposed in the left temple piece 246 and electrically coupled using a connection 274 to the remainder of the computer 261 disposed in the right temple piece 247. One or more I/O devices can include a connector or port (not shown) suitable for charging a battery 262 accessible from the outside of the frame 232, a wireless receiver, transmitter, or transceiver (not shown), or a combination of such devices. Given the limited size of the glasses 231 and the computer 261, resource intensive operations such as video streaming can quickly drain the battery 262 and can be a strain on the one or more processors of the computer 261 that can lead to overheating.

The glasses 231 include digital cameras 269. Although two cameras 269 are depicted, other embodiments contemplate the use of a single or additional (i.e., more than two) cameras. For ease of description, various features relating to the cameras 269 will further be described with reference to only a single camera 269, but it will be appreciated that these features can apply, in suitable embodiments, to both cameras 269.

Consistent with some embodiments, the cameras 269 are examples of the camera 160 of the first user 106-1 discussed above in reference to FIG. 1. Accordingly, in these embodiments, the glasses 231 may be worn by the user 106-1. Further, in these embodiments, the user 106-2 may be enabled to control image capture by the cameras 269 as part of a camera sharing session. During the camera sharing session, single frame images or short videos generated by the cameras 269 are sent to the client device 110-2. By providing only single frame images or short videos to the client device 106-2 during the camera sharing session, rather than a continuous stream of video content as is done in traditional video streaming, power consumption from the battery 262 and the strain on the one or more processors of the computer 261 is reduced compared at least to traditional video streaming.

In various embodiments, the glasses 231 may include any number of input sensors or peripheral devices in addition to the cameras 269. The front piece 233 is provided with an outward-facing, forward-facing, front, or outer surface 266 that faces forward or away from the user when the glasses 231 are mounted on the face of the user, and an opposite inward-facing, rearward-facing, rear, or inner surface 267 that faces the face of the user (e.g., user 106-1) when the glasses 231 are mounted on the face of the user. Such sensors can include inward-facing video sensors or digital imaging modules such as cameras that can be mounted on or provided within the inner surface 267 of the front piece 233 or elsewhere on the frame 232 so as to be facing the user, and outward-facing video sensors or digital imaging modules such as the cameras 269 that can be mounted on or provided with the outer surface 266 of the front piece 233 or elsewhere on the frame 232 so as to be facing away from the user. Such sensors, peripheral devices, or peripherals can additionally include biometric sensors, location sensors, accelerometers, or any other such sensors.

The glasses 231 further include an example embodiment of a camera control mechanism or user input mechanism comprising a camera control button mounted on the frame 232 for haptic or manual engagement by the user. The camera control button provides a bi-modal or single-action mechanism in that it is disposable by the user between only two conditions, namely an engaged condition and a disengaged condition. In this example embodiment, the camera control button is a pushbutton that is by default in the disengaged condition, being depressible by the user to dispose it to the engaged condition. Upon release of the depressed camera control button, it automatically returns to the disengaged condition.

In other embodiments, the single-action input mechanism can instead be provided by, for example, a touch-sensitive button comprising a capacitive sensor mounted on the frame 232 adjacent to its surface for detecting the presence of a user's finger to dispose the touch-sensitive button to the engaged condition when the user touches a finger to the corresponding spot on the outer surface of the frame 232. It will be appreciated that the above-described camera control button and capacitive touch button are but two examples of a haptic input mechanism for single-action control of the camera 269 and that other embodiments may employ different single-action haptic control arrangements.

Figure 3:
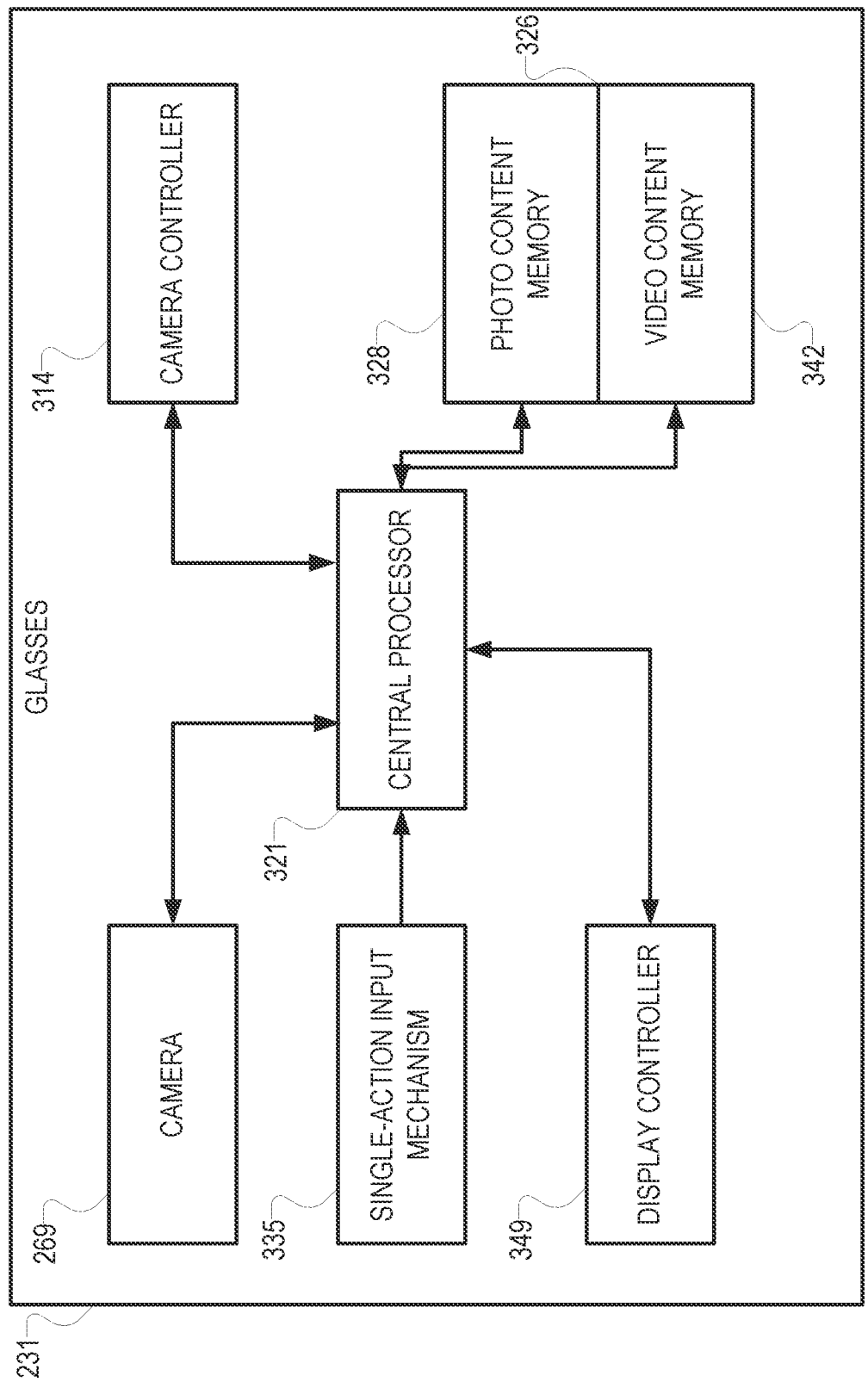
FIG. 3 is a block diagram illustrating aspects of the wearable device, according to some example embodiments.

FIG. 3 is a block diagram illustrating aspects of the wearable device in the example form of the glasses 231, according to some example embodiments. The computer 261 of the glasses 231 includes a central processor 321 in communication with an onboard memory 326. The central processor 321 may be a CPU and/or a graphics processing unit (GPU). The memory 326 in this example embodiment comprises a combination of flash memory and random-access memory.

The glasses 231 further include a camera controller 314 in communication with the central processor 321 and the camera 269. The camera controller 314 comprises circuitry configured to control recording of either photographic content or video content based upon processing of control signals received from the single-action input mechanism that includes the camera control button, and to provide for automatic adjustment of one or more image-capture parameters pertaining to capturing of image data by the camera 269 and on-board processing of the image data prior to persistent storage thereof and/or to presentation thereof to the user for viewing or previewing.

In some embodiments, the camera controller 314 comprises permanently configured circuitry, such as firmware or an application-specific integrated circuit (ASIC) configured to perform the various functions described herein. In other embodiments, the camera controller 314 may comprise a dynamically reconfigurable processor executing instructions that temporarily configure the processor to execute the various functions described herein.

The camera controller 314 interacts with the memory 326 to store, organize, and present image content in the form of photo content and video content. To this end, the memory 326 in this example embodiment comprises a photo content memory 328 and a video content memory 342. The camera controller 314 is thus, in cooperation with the central processor 321, configured to receive from the camera 269 image data representative of digital images produced by the camera 269 in accordance with some of the image-capture parameters, to process the image data in accordance with some of the image-capture parameters, and to store the processed image data in an appropriate one of the photo content memory 328 and the video content memory 342.

The camera controller 314 is further configured to cooperate with a display controller 349 to cause display on a display mechanism incorporated in the glasses 231 of selected photos and videos in the memory 326 and thus to provide previews of captured photos and videos. In some embodiments, the camera controller 314 will manage processing of images captured using automatic bracketing parameters for inclusion in a video file.

A single-action input mechanism 335 is communicatively coupled to the central processor 321 and the camera controller 314 to communicate signals representative of a current state of the camera control button and thereby to communicate to the camera controller 314 whether or not the camera control button is currently being pressed. The camera controller 314 further communicates with the central processor 321 regarding the input signals received from the single-action input mechanism 335. In one embodiment, the camera controller 314 is configured to process input signals received via the single-action input mechanism 335 to determine whether a particular user engagement with the camera control button is to result in a recording of video content or photographic content and/or to dynamically adjust one or more image-capture parameters based on processing of the input signals. For example, pressing of the camera control button for longer than a predefined threshold duration causes the camera controller 314 automatically to apply relatively less rigorous video processing to captured video content prior to persistent storage and display thereof. Conversely, pressing of the camera control button for shorter than the threshold duration in such an embodiment causes the camera controller 314 automatically to apply relatively more rigorous photo stabilization processing to image data representative of one or more still images.

The glasses 231 may further include various components common to mobile electronic devices such as smart glasses or smart phones (for example, including a display controller for controlling display of visual media (including photographic and video content captured by the camera 269) on a display mechanism incorporated in the device). Note that the schematic diagram of FIG. 3 is not an exhaustive representation of all components forming part of the glasses 231.

Figure 4:
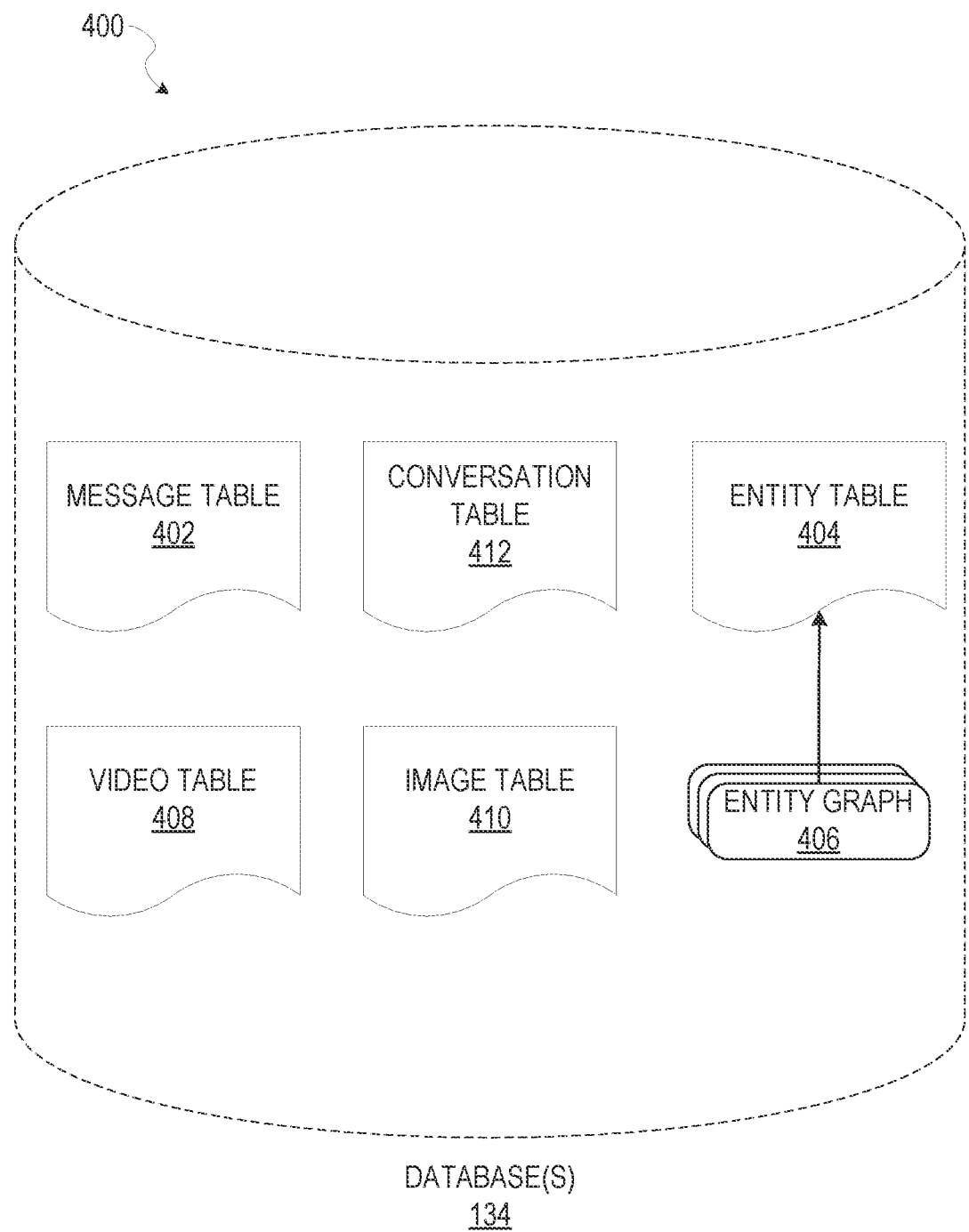
FIG. 4 is a schematic diagram illustrating data which may be stored in a database of a messaging server system, according to example embodiments.

FIG. 4 is a schematic diagram illustrating data 400 which may be stored in one or more of the databases 134 of the messaging system 130, according to certain example embodiments. While the content of the data 400 is shown to comprise a number of tables, it will be appreciated that the data 400 could be stored in other types of data structures (e.g., as an object-oriented database).

The data 400 includes message data stored within a message table 402. An entity table 404 stores entity data, including an entity graph 406. Entities for which records are maintained within the entity table 404 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 406 furthermore stores information regarding relationships and associations between entities. Such relationships may be social, professional (e.g., work at a common corporation or organization), interested-based, or activity-based, merely for example.

A video table 408 stores video data associated with messages for which records are maintained within the message table 402. Similarly, an image table 410 stores image data associated with messages for which message data is stored in the message table 402.

A conversation table 412 stores data regarding chat conversations and associated content (e.g., image, video, or audio data). A record for each chat conversation may be maintained in the conversation table 412. Each record may include a unique identifier for the chat conversation, a retention duration attribute, identifiers of entities that are participants in the chat conversation (or pointers to the identifiers in the entity table 404), and message data (or pointers to corresponding message data in the message table 402).

Figure 5:
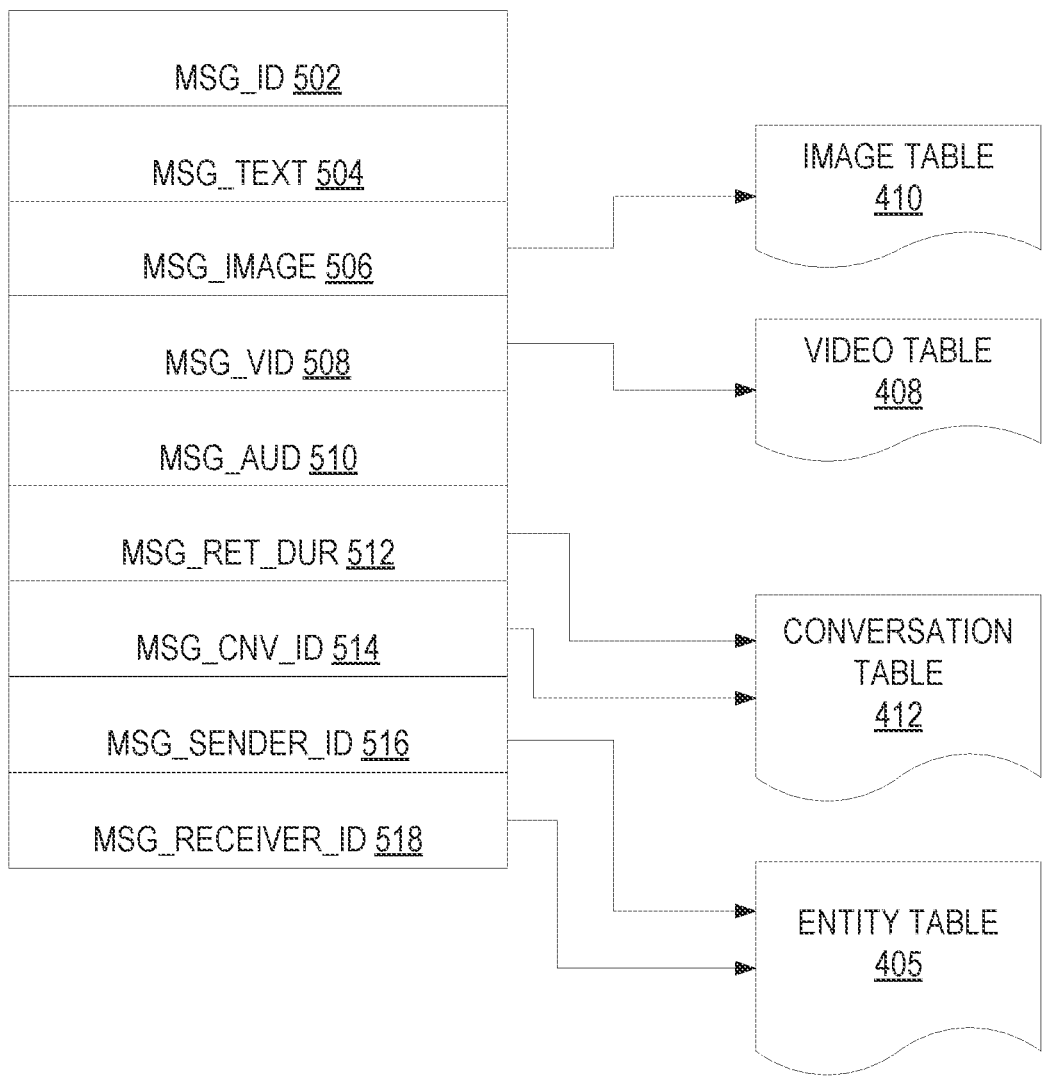
FIG. 5 is a schematic diagram illustrating a structure of a message generated by a messaging client application for communication, according to example embodiments.

FIG. 5 is a schematic diagram illustrating a structure of a message 500, according to some embodiments, generated by a client application 112 for communication to a further client application 112 or one or more application logic modules 150. The content of a particular message 500 is used to populate the message table 402 stored within database 134, accessible by the application logic modules 150. Similarly, the content of a message 500 is stored in memory as "in-transit" or "in-flight" data of one of the client devices 110-1 or 110-2 or the messaging system 130. The message 500 is shown to include the following components:

A message identifier 502: a unique identifier that identifies the message 500.

A message text payload 504: text, to be generated by a user via a user interface of one of the client devices 110-1 or 110-2 and that is included in the message 400.

A message image payload 506: image data, captured by a camera component of one of the client devices 110-1 or 110-2 or retrieved from memory of one of the client devices 110-1 or 110-2, and that is included in the message 500.

A message video payload 508: video data, captured by a camera component or retrieved from a memory component of one of the client device 110-1 or 110-2 and that is included in the message 500.

A message audio payload 510: audio data, captured by a microphone or retrieved from the memory component of one of the client device 110-1 or 110-2, and that is included in the message 500.

A message duration attribute 512: an attribute value indicating, in seconds, the amount of time for which content of the message 500 (e.g., the message image payload 506, message video payload 508, and message audio payload 510) is to be made accessible to a user via the client application 112 upon accessing the message 500.

A conversation identifier 514: an identifier indicative of the chat conversation to which the message belongs.

A message sender identifier 516: an identifier (e.g., a messaging system identifier, email address, or device identifier) indicative of a user of one of the client devices 110-1 or 110-2 on which the message 400 was generated and from which the message 400 was sent.

A message receiver identifier 518: an identifier (e.g., a messaging system identifier, email address, or device identifier) indicative of a user of one of the client devices 110-1 and 110-2 to which the message 500 is addressed.

The contents (e.g., values) of the various components of the message 500 may be pointers to locations in tables within which content data values are stored. For example, an image value in the message image payload 506 may be a pointer to (or address of) a location within the image table 410. Similarly, values within the message video payload 508 may point to data stored within the video table 408, values stored within the conversation identifier 514 may point to data stored within the conversation table 412, and values stored within the message sender identifier 516 and the message receiver identifier 4518 may point to user records stored within the entity table 404.

FIG. 6A-6H are conceptual diagrams illustrating a timeline 600 of an example camera sharing session between the user 106-1 (also referred to herein and in FIGS. 6A-6H as the "first user") and at least the user 106-2 (also referred to herein and in FIGS. 6A-6H as the "second user"), according to some example embodiments. In the context of the example camera sharing session described below, the second user is enabled to control image capturing at the camera 160 of the first user. However, it shall be appreciated that the second user may be one of a plurality of users that are enabled to control image capturing at the camera 160 of the first users.

In some embodiments, the camera 160 of the first user is an embedded camera of the client device 110-1 such as a smartphone. In some embodiments, the camera 160 of the first user is an embedded camera of the companion device 114 such as a wearable device (e.g., glasses 231).

Consistent with these embodiments, the second user may utilize the client application 112 executing on the client device 110-2 to control the image capturing at the camera 160 of the first user. In this example camera sharing session, the client application 112 is not initially executing on the client device 110-2 of the second user.

Figure 6A:
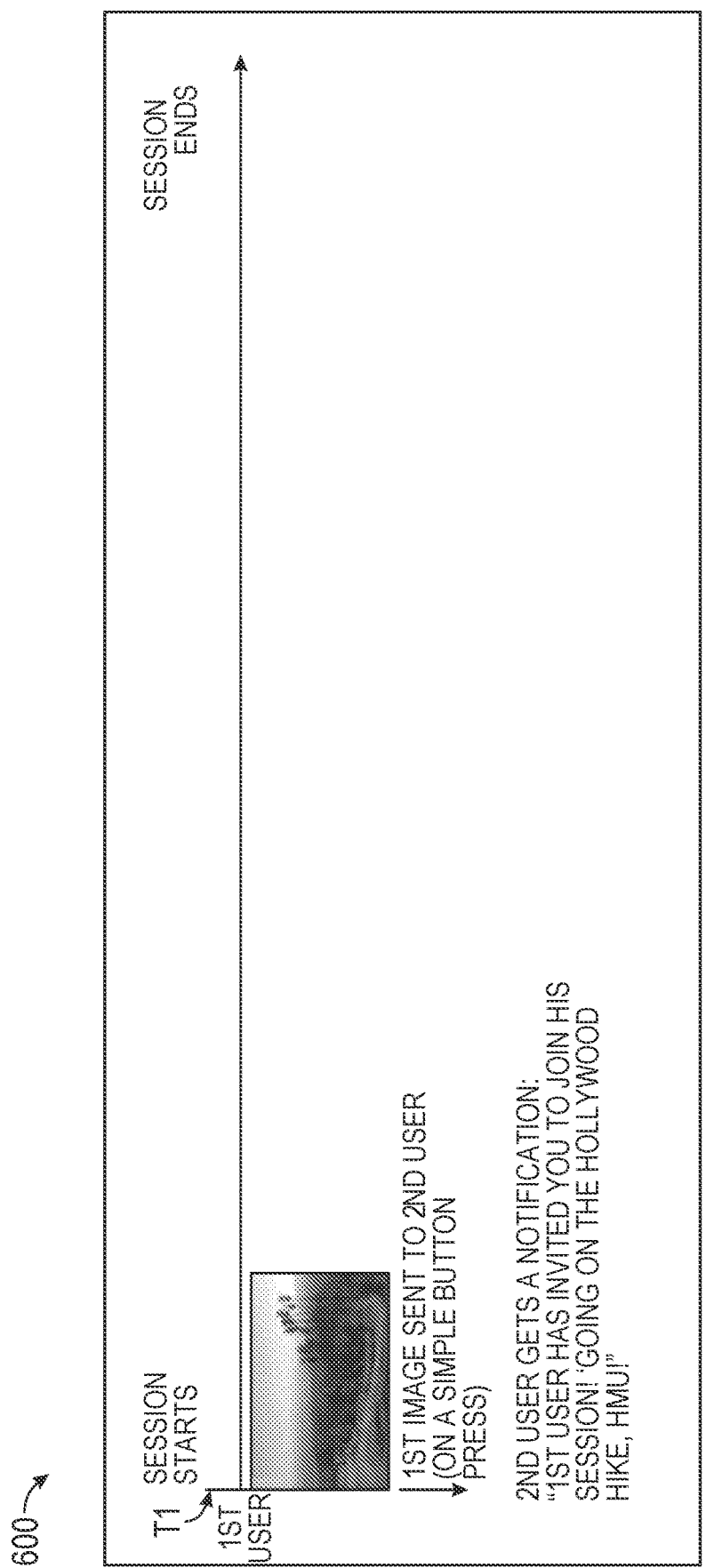
FIGS. 6A-6H are conceptual diagrams illustrating a timeline of an example camera sharing session between two users, according to some example embodiments.

As shown in FIG. 6A, the example camera sharing session starts at T1. At the start of the camera sharing session the messaging system 130 sends a first message to the client device 110-2 of the second user. The first message comprises an invitation comprising first image data (e.g., comprising at least a first image) captured by the camera 160 of the first user. The first message may further include audio data simultaneously recorded by a microphone of the client device 110-1. The invitation is sent to the client device 110-2 of the second user based on an inclusion of a user identifier of the second user being included in session configuration information associated with the camera sharing session. The session configuration information may be specified by the first user using the client application 112 executing on the client device 110-1. The invitation may further include a textual description generated by the first user that is included in the session configuration information.

Figure 6B:
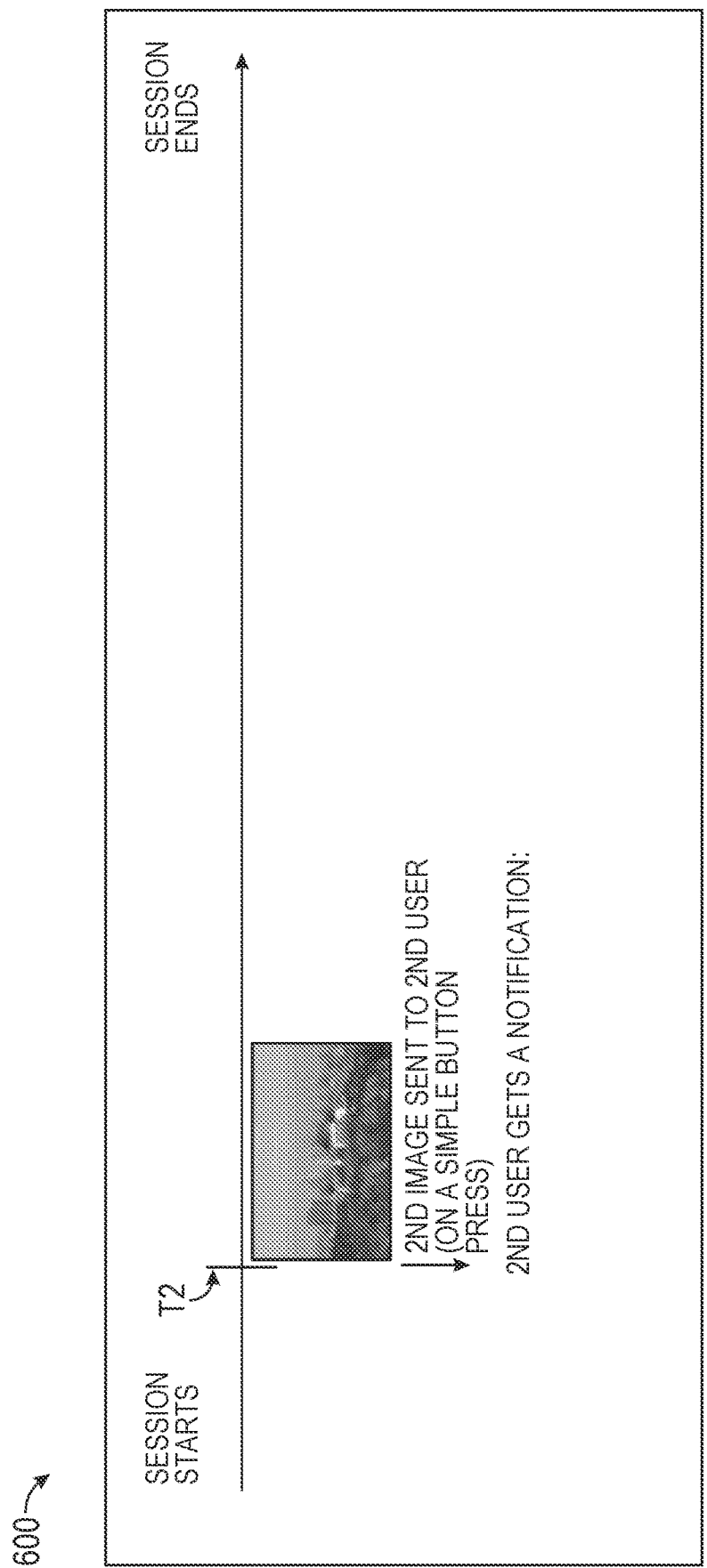

As shown in FIG. 6B, at T2, the first user creates a second message comprising second image data (e.g., comprising at least a second image) generated by the camera 160 of the first user after the invitation is sent to the client device 110-2 of the second user. As an example, in some embodiments, the second image data may be generated by a camera 269 of the glasses 231 in response to a single press of the camera control button mounted on the frame 232 by the first user. Within the second message, the second image data may be augmented with additional content such as text, emojis, graphics and other visual effects specified by the first user or added by default. The second message may further include audio data simultaneously recorded by the microphone of the client device 110-1. The messaging system 130 sends the second message to the client device 110-2 and causes the client device 110-2 to present a notification of the second message. Allowing the first user to generate and transmit image data with a single button press, as set forth above, provides a mechanism for sending images that increases the efficiency of the interaction compared to traditional user interface-based methodologies that may require the first user to navigate between multiple windows or screens and perform potentially multiple button presses. For example, traditional user interfaces require users to first provide input to capture image data (e.g., a single image frame or video), provide another input or series of inputs to choose recipients for the image data, and possibly another input to confirm/initiate the transmission of that photo or video to the selected recipients.

Figure 6C:
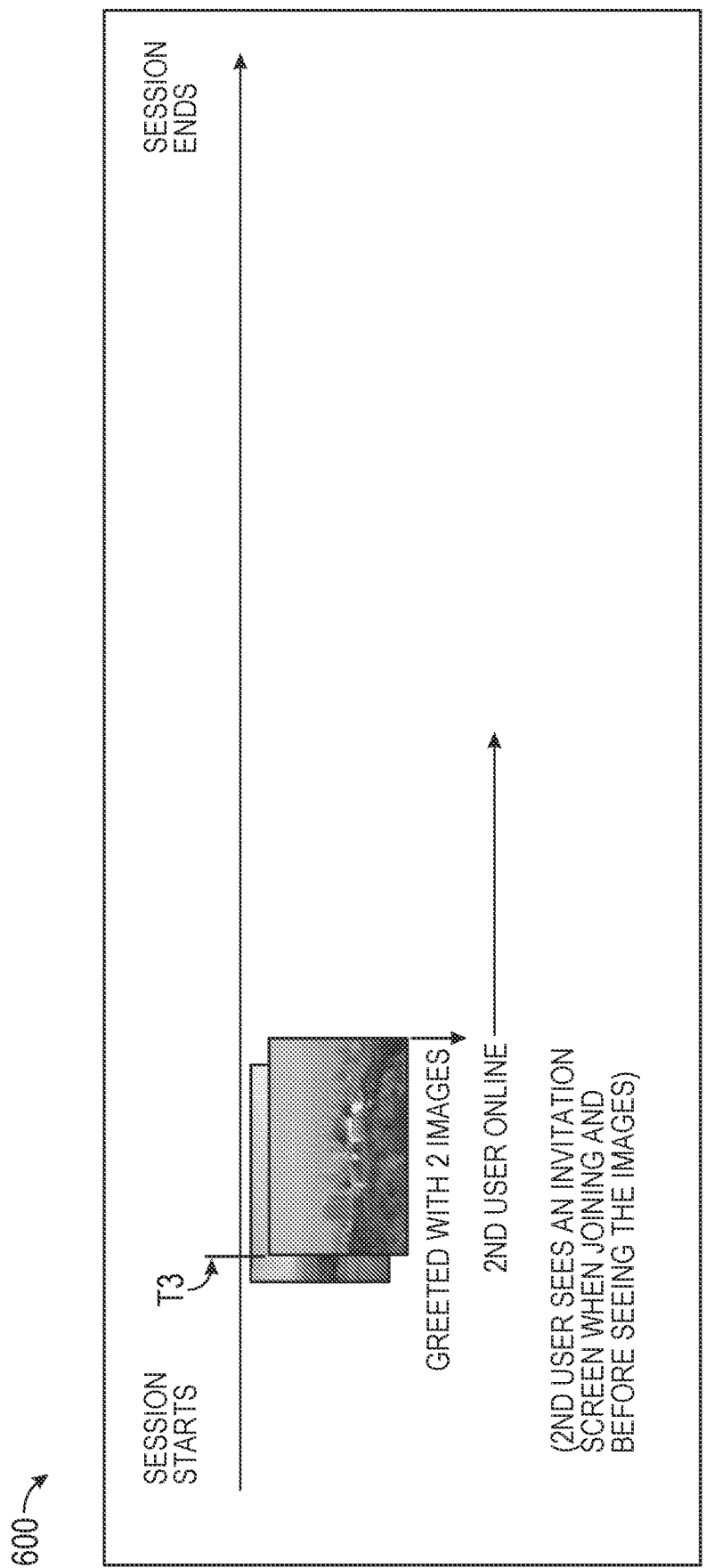
Figure 6D:
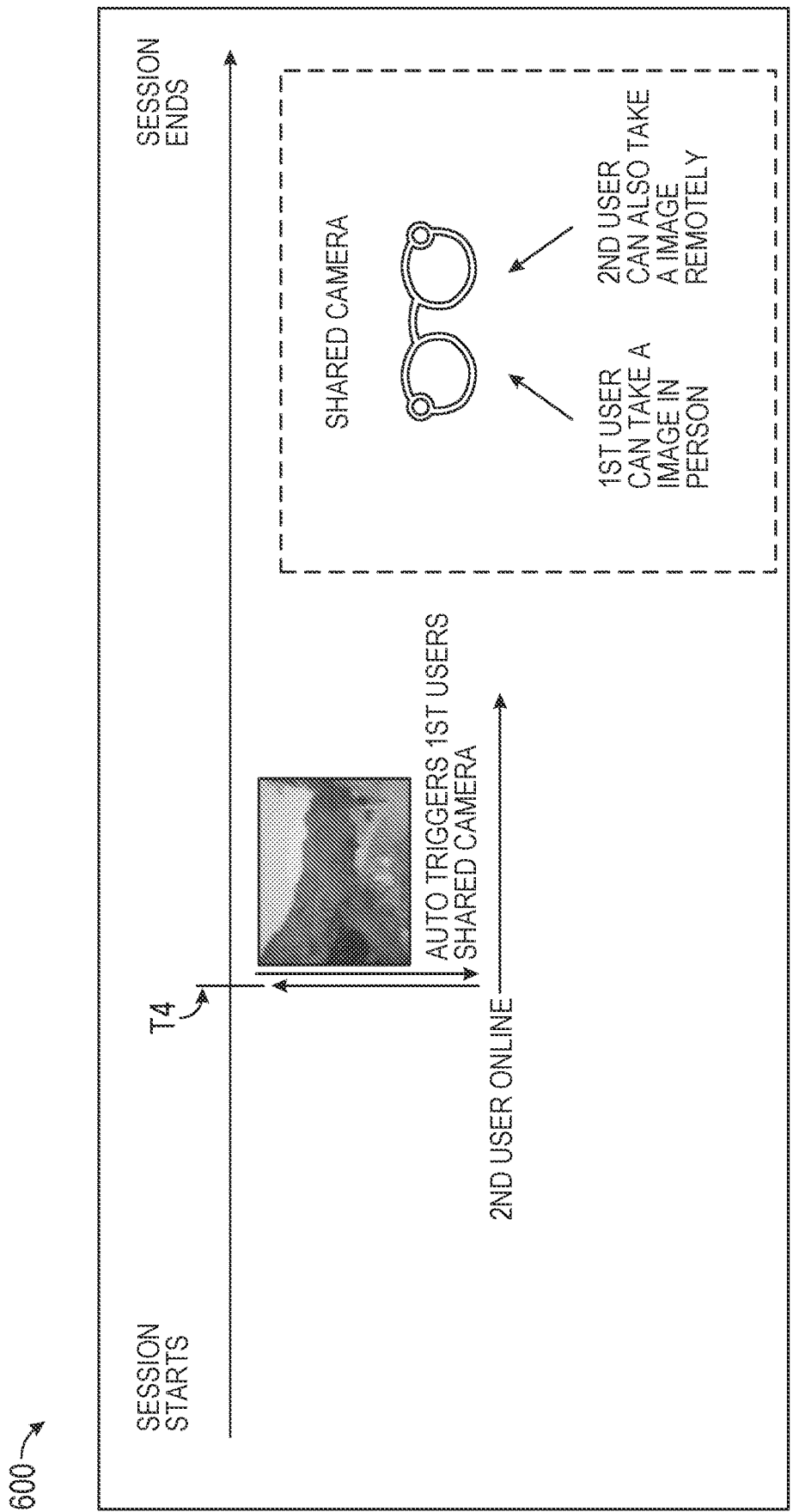

As shown in FIG. 6C, upon the second user opening the client application 112 on the client device 110-2, the client device 110-2 presents the first and second message to the second user, at T3. Upon viewing the invitation, the second user may be provided an option to join the camera sharing session, and as shown in FIG. 6D, upon receiving an indication of the second user joining the camera sharing session, the messaging system 130 triggers an image capture at the camera 160, which results in generation of third image data (e.g., comprising at least a third image), at T4. In embodiments in which the image data includes a short video, the messaging system 130 may initiate a video capture at the camera that ends after a predefined period of time. The messaging system 130 transmits a third message comprising at least the third image data to the client device 110-2 of the second user.

In embodiments in which the third image data includes a short video, in presenting the third image data, the client device 110-2 may also present an additional video feed depicting the first user in the surrounding environment. Consistent with these embodiments, the client device 110-1 or another display device in communication with the client device 110-1 may simultaneously present a video feed depicting the second user. In this way, the messaging system 130 may allow the first and second users to communicate directly with one another while also allowing the second user to share in the first user's experience. As an example of the forgoing, suppose the first user is in an elephant safari park in Thailand and is about to feed an elephant. In this example, the second user may want to experience the exact moment when the first user puts their hands near the elephant's mouth by viewing both the actual interaction with the elephant as well as the first user's reaction to the interaction.

Figure 6E:
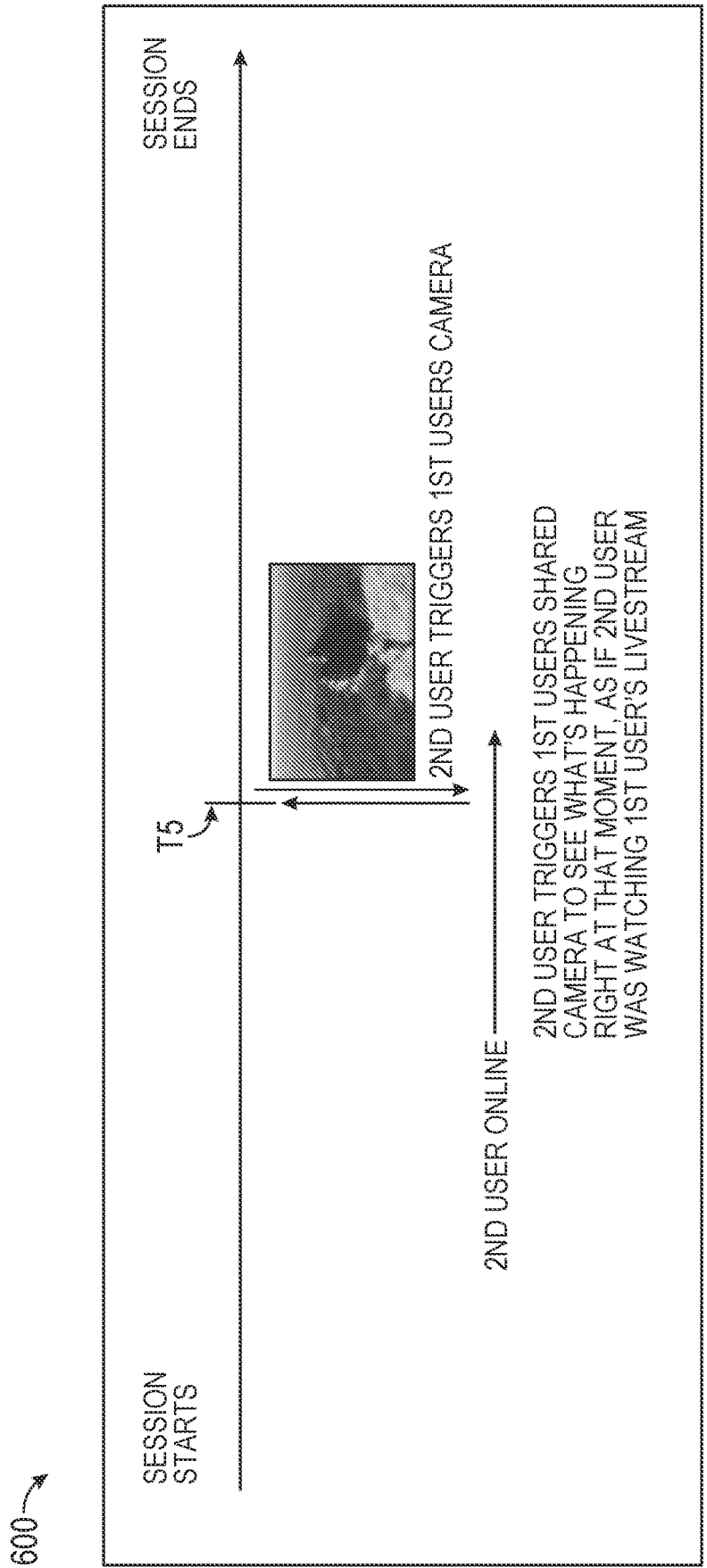

As shown in FIG. 6E, at T5, the second user may trigger an additional image capture at the camera 160 by submitting a first trigger request to the messaging system 130. The second user may submit the first trigger request via a GUI provided by an application running on the client device 110-2. In response to the trigger request, the messaging system 130 again triggers an image capture at the camera 160, thereby resulting in generation of fourth image data (e.g., comprising at least a fourth image). The messaging system 130 transmits a fourth message to the client device 110-2 that includes at least the fourth image data and may further include audio data. As with the prior image capture, the first user may be provided with the option to prevent the image capture.

In some embodiments, prior to the image capture, the first user may be provided the option to prevent the image capture. For example, in some embodiments, if the first user does not request to prevent the image capture after a specified period of time, the image capture will be triggered. In some embodiments, the first user may be required to permit the image capture before it is triggered. As an example, in some embodiments, the first user may use a physical button of the glasses 231 (e.g., the camera control button) to provide input indicative of either authorization of the image capture or a request to prevent the image capture.

Figure 6F:
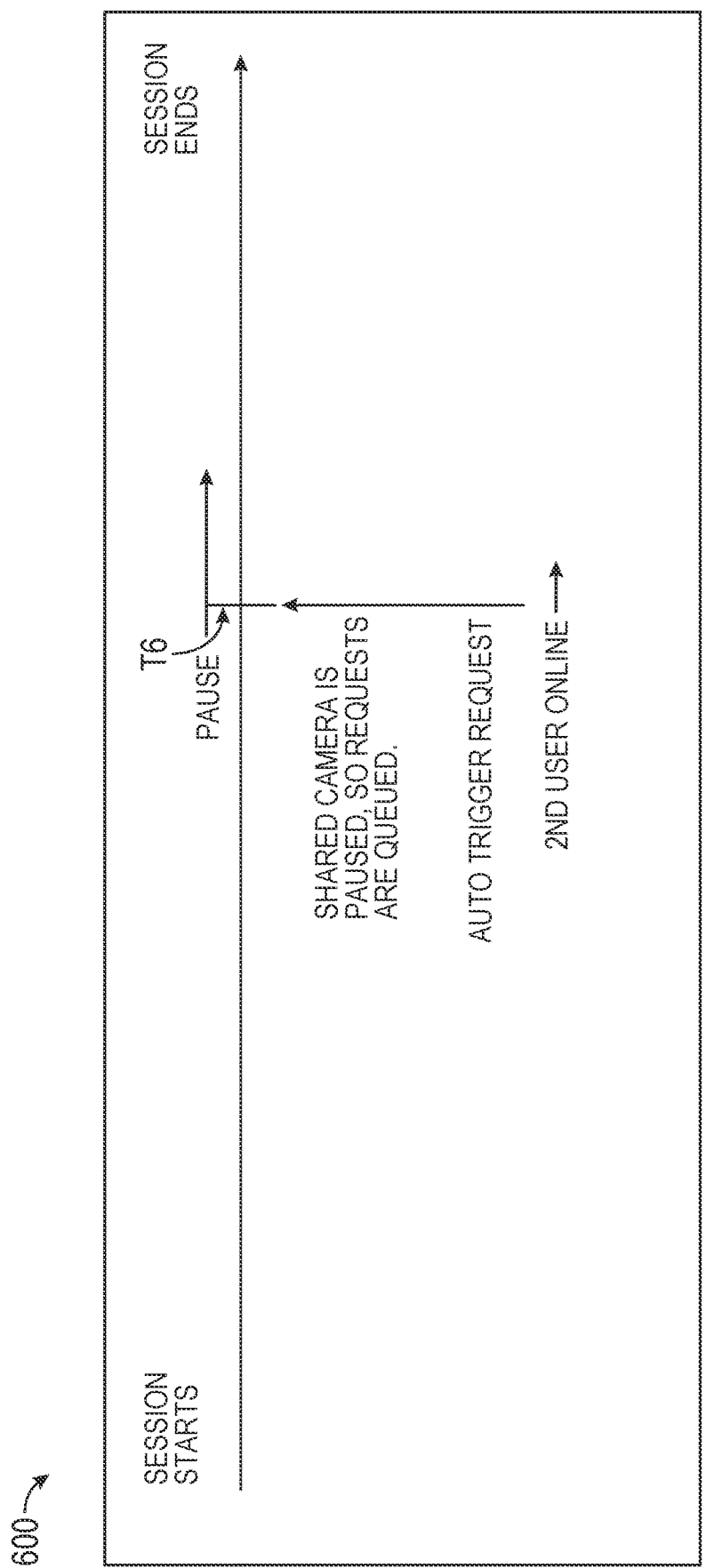

As shown in FIG. 6F, at T6, the messaging system 130 pauses the camera sharing session. The messaging system 130 may pause the camera sharing session in response to input provided by the first user (e.g., at client device 110-1 or at the companion device 114). Also at T6, the second user uses the client device 110-2 to submit a second trigger request to the messaging system 130 while the camera sharing session is paused. Because the camera sharing session is paused, the messaging system 130 adds the second trigger request to a request queue. The request queue includes one or more trigger requests to be execution once the camera sharing session resumes.

Figure 6G:
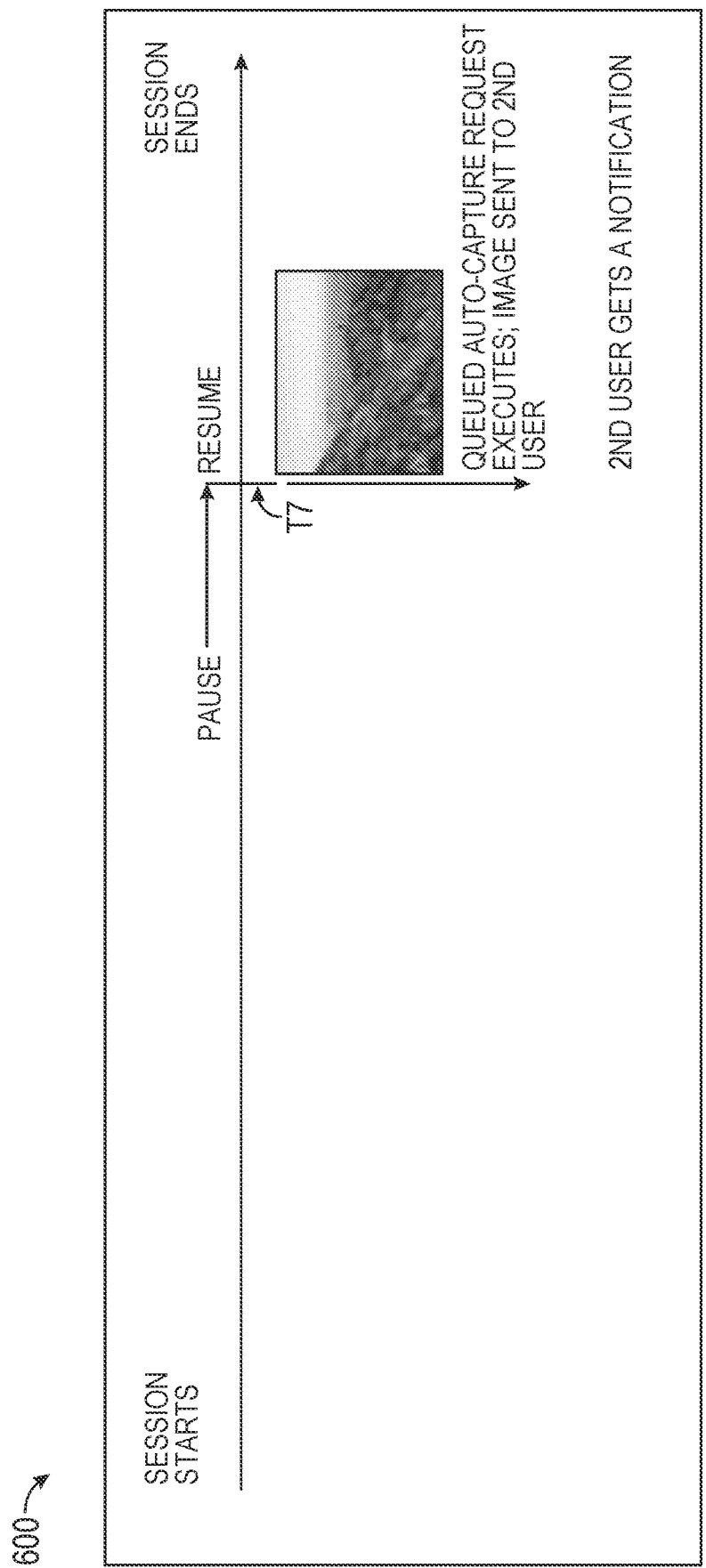

As shown in FIG. 6G, the camera sharing session is resumed at T7, at which time the messaging system 130 executes the second trigger request from the request queue, which results in generation of fifth image data (e.g., comprising at least a fifth image) by the camera 160. The messaging system 130 transmits a fifth message to the client device 110-2 of the second user that comprises at least the fifth image data.

Figure 6H:
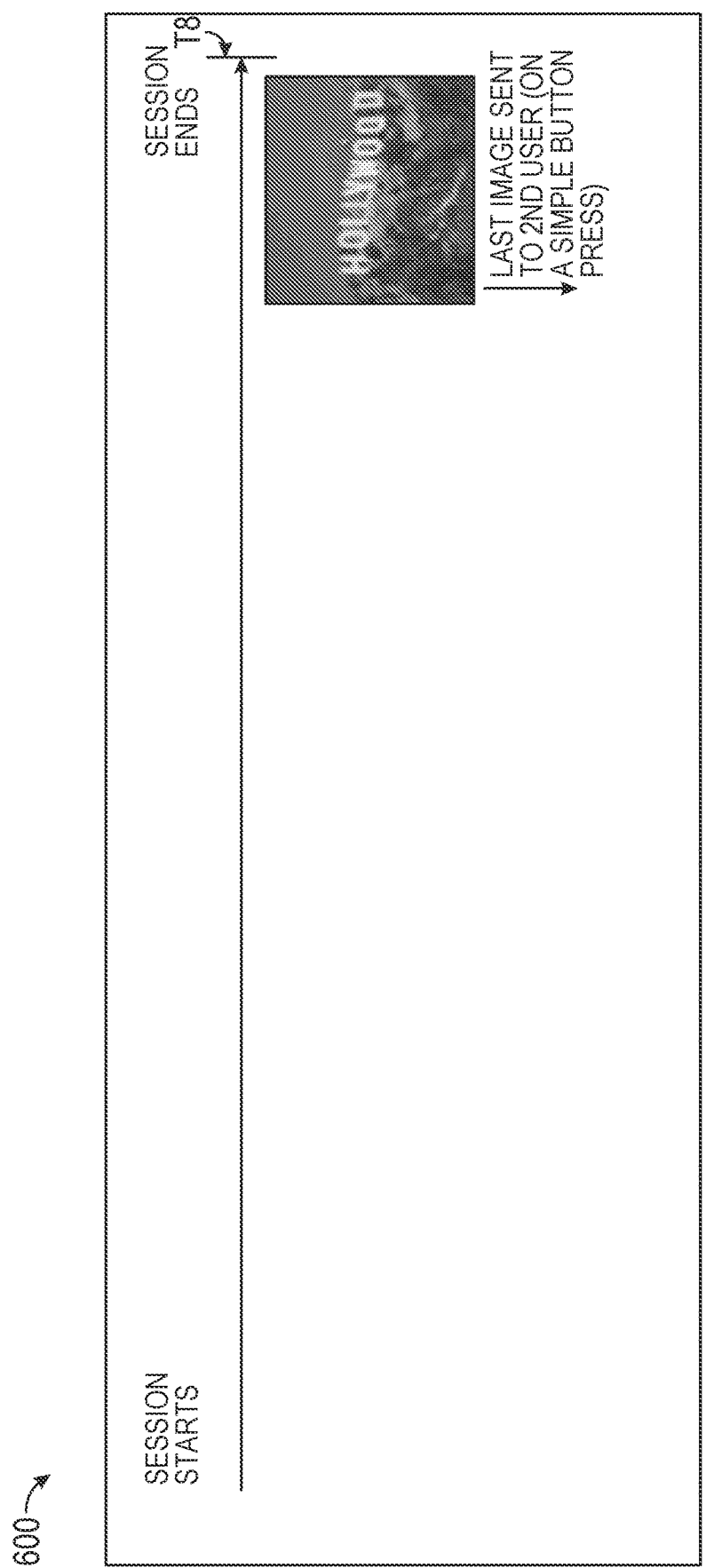
Figure 7:
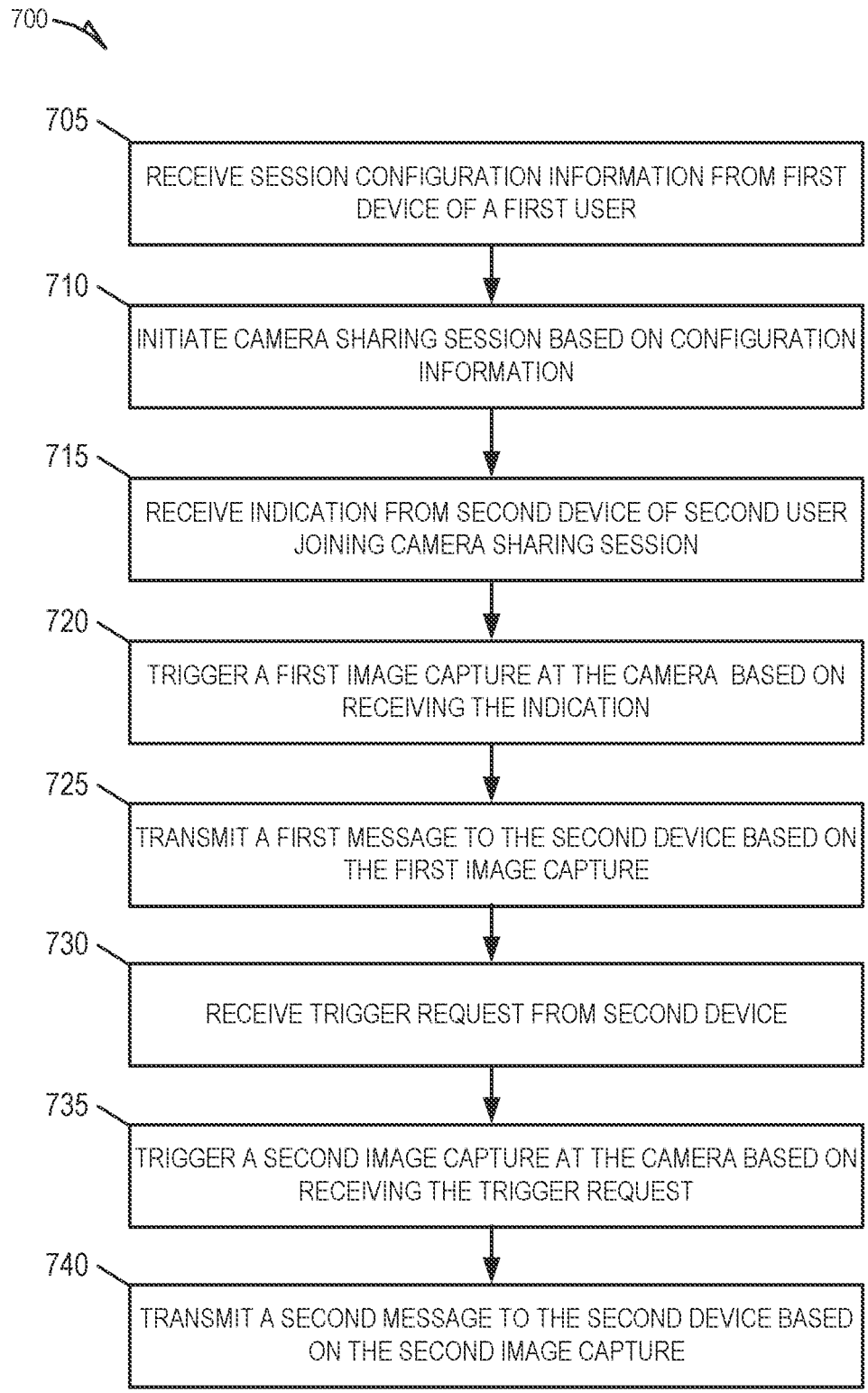
FIGS. 7-11 are flowcharts illustrating operations of the messaging system in performing a method for toggling between a conversation view and a camera feed view, according to example embodiments.

As shown in FIG. 6H, at T8, the first user creates a sixth message comprising at least a sixth image generated by the camera 160. The sixth message is sent to the client device 110-2 of the second user and the camera sharing session ends thereafter.

FIGS. 7-10 are flowcharts illustrating operations of the messaging system in performing a method 700 for facilitating a camera sharing session between two or more users, according to example embodiments. The method 700 may be embodied in computer-readable instructions for execution by one or more processors such that the operations of the method 700 may be performed in part or in whole by the functional components of the communication system 100; accordingly, the method 700 is described below by way of example with reference thereto. However, it shall be appreciated that at least some of the operations of the method 700 may be deployed on various other hardware configurations than the communication system 700.

At operation 705, the messaging system 130 receives session configuration information from a first device (e.g., the client device 110-1). The session configuration is specified by a user of the first device (e.g., the user 106-1; hereinafter "first user"). The session configuration information comprises one or more identifiers corresponding to one or more users (e.g., the user 106-2) who are permitted to control image capturing at a camera (e.g., the camera 160) that is communicatively coupled to the first device during a camera sharing session. For example, the session configuration information includes at least one user identifier corresponding to a second user (e.g., the user 106-2) who is permitted to control image capturing at a camera (e.g., the camera 160). The session configuration information may further include a user-generated textual description associated with the camera sharing session.

In some embodiments, the camera is an embedded camera of the first device (e.g., a smartphone camera). In some embodiments, the camera is an embedded camera of a companion device (e.g., companion device 114) such as a wearable device (e.g., glasses 231).

Consistent with some embodiments, a messaging application (e.g., the client application 112) executing on the first device may provide a graphical user interface (GUI) to the first device for inputting the session configuration information. The GUI may include at least a first input field for specifying one or more user identifiers and a second input field for inputting a textual description associated with the camera sharing session. Consistent with these embodiments, the first user may input the session configuration information using the GUI.

At operation 710, the communication system 100 initiates the camera sharing session based on the session configuration information. The initiating of the camera sharing session includes at least transmitting an invitation to a second device (e.g., the client device 110-2) associated with the second user included in the session configuration information. The communication system 100 may transmit an invitation to each user specified in the session configuration information. Further details regarding the initiating of the camera sharing session are discussed below in reference to FIG. 8, according to some example embodiments.

At operation 715, the messaging system 130 receives an indication from the second device (e.g., from the messaging application) of the second user joining the camera sharing and based on receiving the indication, the messaging system 100, at operation 720, triggers a first image capture at the camera. The first image capture results in generation of first image data comprising at least a first image. The first image data may include a single image from or a short video (e.g., 5 seconds) comprising multiple image frames. The messaging system 130 may trigger an image capture at the camera by transmitting a command to either the first device or a companion device that causes an image to be captured by the camera. In embodiments in which the camera is embedded in a companion device, the communication system 100 may either communicate the command directly to the companion device or may communicate the command to the first device, which in turn transmits the command to the companion device to trigger the image capture.

At operation 725, the messaging system 130 transmits a first message to the second device based on the first image capture. The first message comprises at least the first image data. In some embodiments, the first message may comprise the first image data augmented with additional content (e.g., text, emojis, graphics, and/or visual effects). The first image data may be augmented with the additional content based on user input. The first message may further include audio data simultaneously recorded with the capturing of the first image data.

At operation 730, the messaging system 130 receives a trigger request from the second device. Consistent with some embodiments, a messaging application (e.g., the client application 112) executing on the second device may provide a GUI that includes functionality to enable the second user to submit the trigger request. For example, the GUI may include a button or other selectable element, the selection of which invokes a trigger request.

At operation 735, the messaging system 130 triggers a second image capture at the camera based on receiving the trigger request. The second image capture results in generation of second image data comprising at least a second image. As with the first image data, the second image data may include a single image from or a short video (e.g., 5 seconds) comprising multiple image frames. In this way, the camera sharing session allows the second user to remotely trigger image capturing at the camera of the first user. As noted above, the messaging system 130 may trigger the second image capture by transmitting a command to the first device or the companion device, depending on the embodiment. In embodiments in which the image data includes a short video, the messaging system 130 may initiate a video capture at the camera that ends after a predefined period of time (e.g., 5 seconds).

At operation 740, the messaging system 130 transmits a second message to the second device based on the second image capture. The second message comprises at least the second image data.

In the context of the method 700 described above, a single image frames or short videos (e.g., 5 seconds) are sent to the second device during the camera sharing session. That is, rather than providing a continuous video stream to allow the first user to share his or her experience with the second user, the method 700 allows the first user's experience to be shared with the second user in single frame image or short video increments. Providing only single frame images or short videos rather than a continuous stream of video content results in a reduction of device power consumption and computational processing resource utilization compared to traditional video streaming while still allowing the first user to share an experience with the second user via image content at any time or location, as if the second user were watching live.

Figure 8:
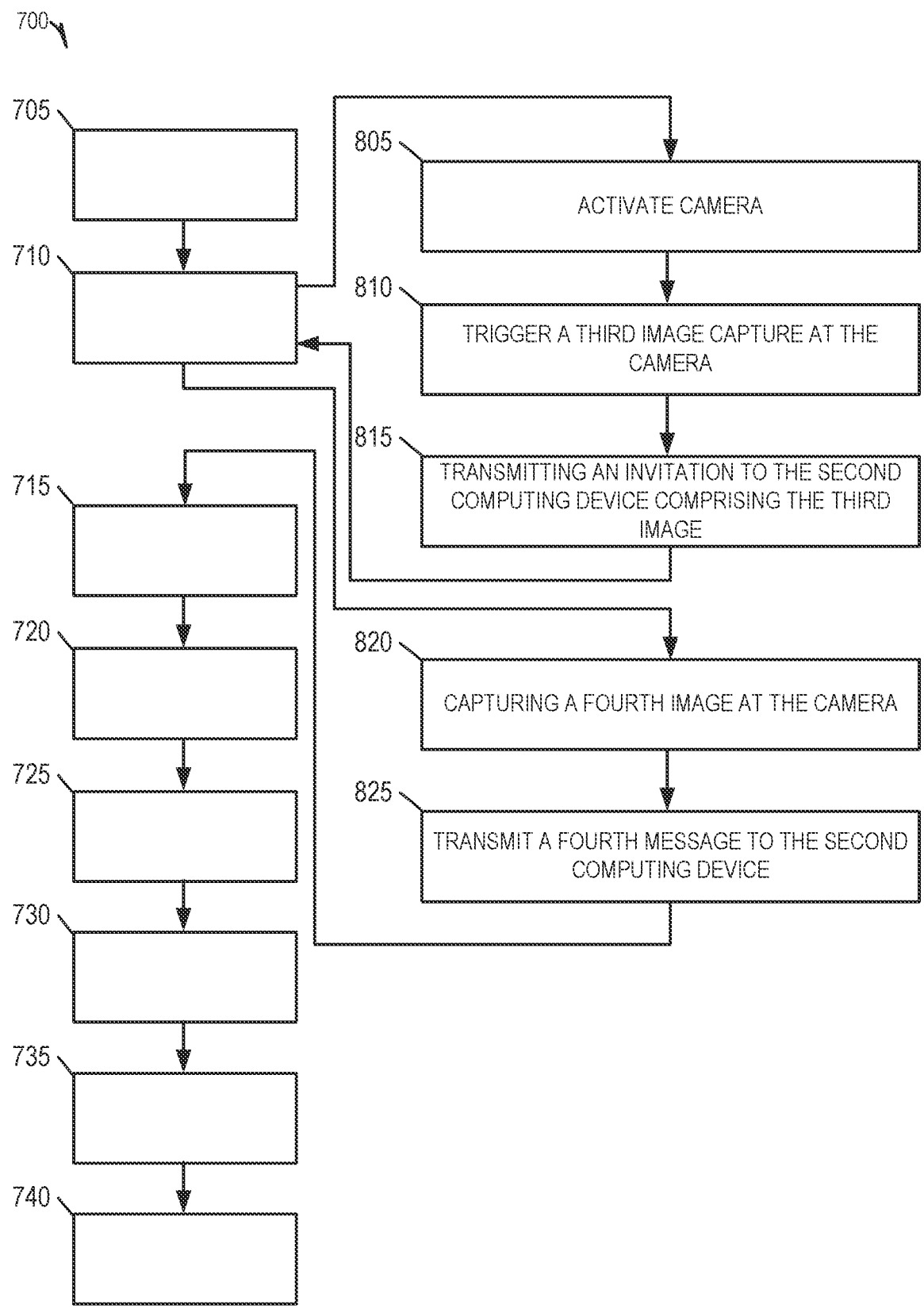

As shown in FIG. 8, the method 700 may further include operations 805, 810, 815, 820, and 825, in some embodiments. Consistent with these embodiments, the operations 805, 810, and 815 may be performed as part of operation 710 where the communication system 100 initiates the camera sharing session. At operation 805, the messaging system 130 activates the camera of the first user, which causes the camera to start producing image data. The image data includes images that depict a real-world scene that is within a field of view of the camera. As noted below in reference to FIG. 10, the second user may, in some embodiments, be enabled to control the field of view of the camera as well.

At operation 810, the messaging system 130 triggers a third image capture at the camera. The third image capture results in generation of third image data (e.g., comprising at least a third image). At operation 815, the messaging system 130 transmits an invitation to the second device inviting the second user to join the camera sharing session. The invitation includes at least the third image data and may further include the user-generated textual description associated with the camera sharing session. In some instances, the second user may be inactive when the camera sharing session begins (e.g., if the second user is offline or the messaging application is not executing on the first device). In these instances, the invitation may be added to a queue of unread messages stored by the second device that may be viewed by the second user when the second user opens the messaging application, or the invitation may simply be transmitted to the second device upon the second user opening the messaging application. In instances in which the invitation is added to the queue, the messaging system 130 may, in some instances, cause a notification (e.g., a push notification) to be presented by the second device.

Consistent with these embodiments, the operations 820 and 825 may be performed subsequent to the operation 710, where the communication system 100 initiates the camera sharing session. At operation 820, the messaging system 130 captures fourth image data (e.g., comprising at least a fourth image) generated by the camera. The capturing of the fourth image data may be in response to user input of the first user received at the first device or a companion device. For example, in some embodiments, the capturing of the fourth image data may be in response to the first user pressing the camera control button of the glasses 231.

At operation 825, the communication system 100 transmits a fourth message to the second device. The fourth message may be automatically transmitted based on the user input that triggered the capturing of the fourth image data, consistent with some embodiments. The fourth message comprises at least the fourth message data and may further include audio data, for example. As with the invitation, in instances in which the second user is not online, the fourth message may be added to a queue of unread messages stored by the second device that may be viewed by the second user when the second user opens the messaging application on the second device, or the fourth message may simply be transmitted to the second device upon the second user opening the messaging application on the second device.

Figure 9:
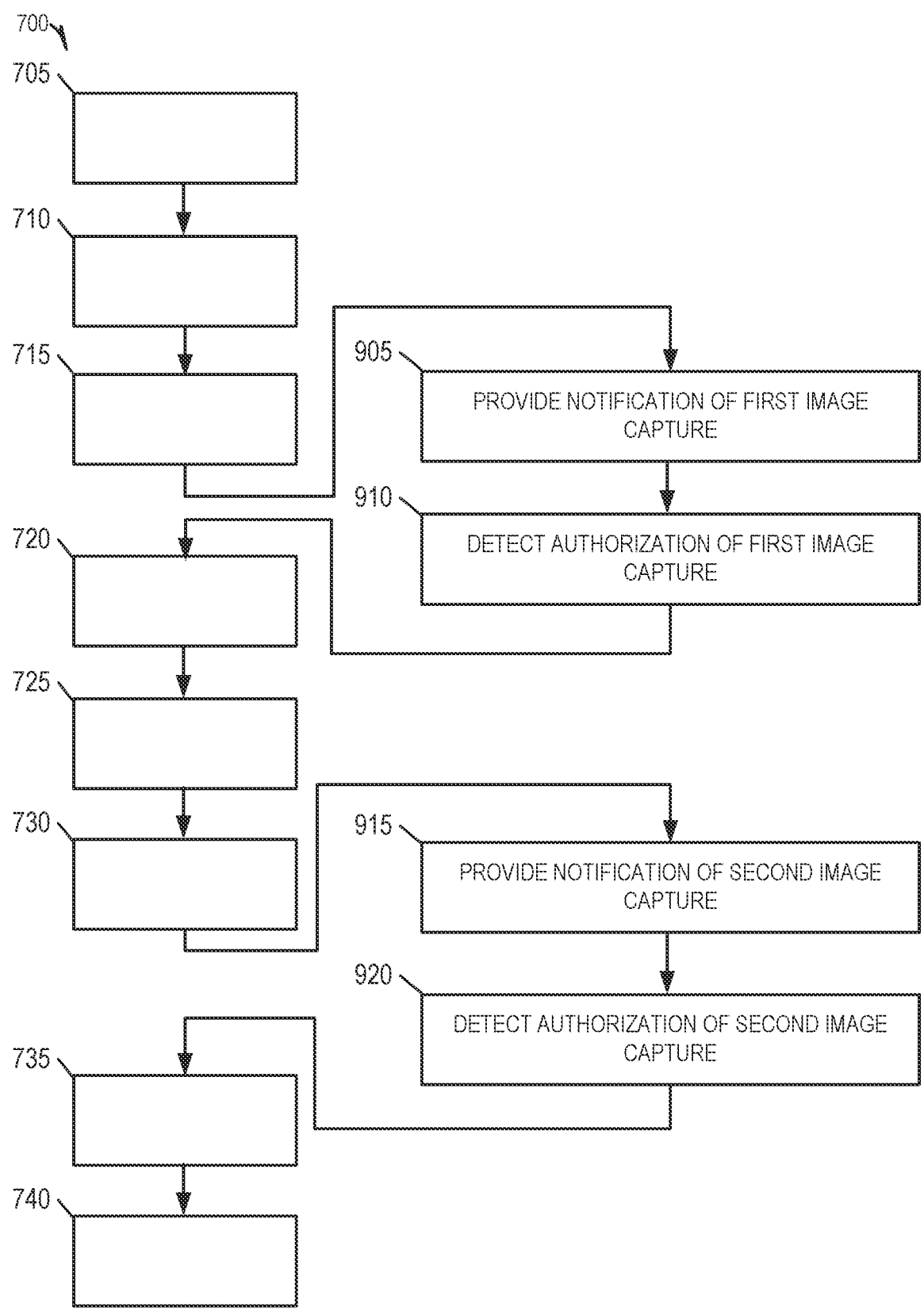

As shown in FIG. 9, the method 700 may, in some embodiments, include operations 905, 910, 915, and 920. Consistent with these embodiments, the operations 905 and 910 may be performed prior to operation 720, where the messaging system 130 triggers the first image capture at the camera. At operation 905, the messaging system 130 provides a first notification to the first device. The first notification notifies the first user of the imminence of the first image capture. The first notification may, for example, comprise a graphical notification presented by the first device or a companion device, or may comprise a more simplistic notification such as an audio notification (e.g., a noise or ringer), a haptic notification (e.g., a vibration), or a visual notification (e.g., a light blink) provided by the first device, the companion device, or both.

In some embodiments, trigger requests may be accepted by default and the first user may be provided with the option to prevent the first image capture. Consistent with these embodiments, the first image capture may occur after a predefined amount of time if the first user has not provided input to indicate that the first image capture is to be prevented.

In some embodiments, trigger requests may be rejected by default and the first user may be provided with an ability to permit the first image capture. Consistent with these embodiments, the first image capture may not occur unless the first user provides authorization within a predefined amount of time.

In some embodiments, the first user may be provided with the option to either permit the image capture or prevent the image capture. Depending on the embodiment, the first user may provide input to the first device or a companion device to either permit or prevent the first image capture. For example, in some embodiments, the first user may utilize a button mounted on the glasses 231 (e.g., the camera control button) to indicate whether the camera sharing session is to be permitted or prevented.

At operation 910, the messaging system 130 detects authorization of the first image capture. In some embodiments, the detecting of the authorization may include determining that the specified amount of time expired without the first user providing input to indicate that the first image capture is to be prevented. In some embodiments, the detecting of the authorization may include receiving input indicative of the first user permitting the first image capture. In a first example, the messaging system 130 receives selection of a button or other selectable element presented within a GUI displayed on the first device that indicates that the first image capture is to be permitted. In a second example, the communication system 100 detects a button press on the companion device of the first device that indicates that the first image capture is to be permitted (e.g., a press of a button mounted on the glasses 231).

Consistent with these embodiments, the operations 915 and 920 may be performed prior to operation 735 where the messaging system 130 triggers the second image capture. At operation 915, the messaging system 130 provides a second notification to the first device. The second notification notifies the first user of the imminence of the second image capture. As with the first notification, the second notification may provide the first user the ability to permit the second image capture or to prevent the second image capture. Likewise, the second notification may, for example, comprise a graphical notification presented by the first device or a companion device, or may comprise a more simplistic notification such as an audio notification (e.g., a noise or ringer), a haptic notification (e.g., a vibration), or a visual notification (e.g., a light blink) provided by the first device, the companion device, or both.

At operation 920, the messaging system 130 detects authorization of the second image capture. As with the second image capture, depending on the embodiment, the detecting of authorization may include either determining that the specified amount of time expired without the first user providing input to indicate that the second image capture is to be prevented or receiving input indicative of the first user permitting the first image capture.

Figure 10:
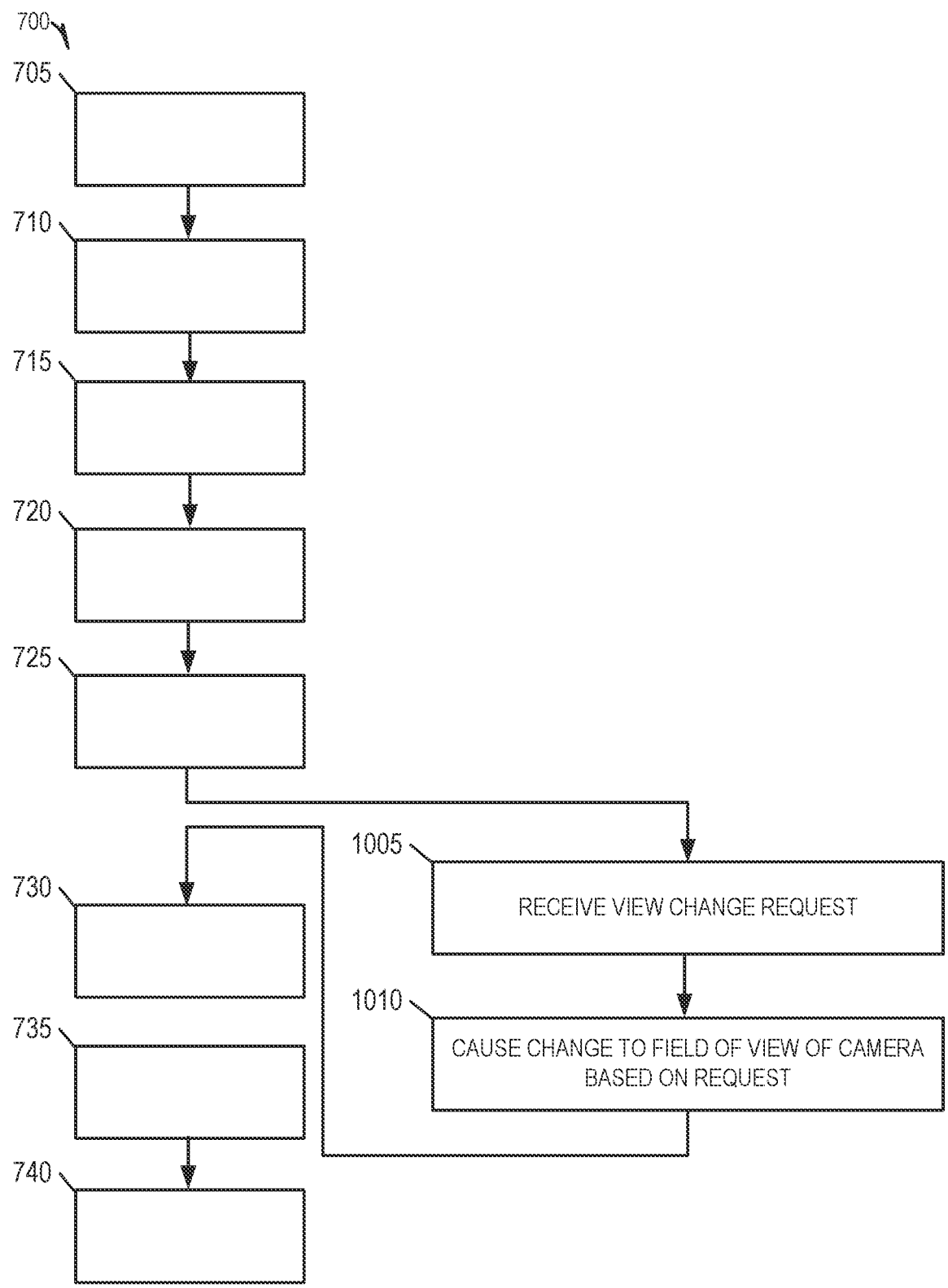

As shown in FIG. 10, the method 700 may, in some embodiments, include operations 1005 and 1010. Although FIG. 10 illustrates the operations 1005 and 1010 as being performed prior to operation 730, it shall be appreciated that the operations 1005 and 1010 may be performed at any point during the camera sharing session after the second user has joined.

At operation 1005, the messaging system 130 receives a view change request from the second device. The camera view change request may include a request to rotate or otherwise change the field of view of the camera. An amount of rotation (e.g., specified in degrees) may be included in the view change request. The camera view change request may be submitted by the second user via a GUI provided by the second device. The GUI may, for example, include a joystick-based control mechanism that allows the second user to specify specific view changes (e.g., the amount of rotation).

At operation 1010, the messaging system 130 causes a change to the field of view of the camera in accordance with the view change request. The messaging system 130 may cause the change by providing the second device with one or more camera commands. For example, the messaging system 130 may provide a command to the second device to cause the camera to rotate by an amount specified in the view change request. In this manner, the second user may control the camera's view without having to ask the first user to move the camera.

Figure 11:
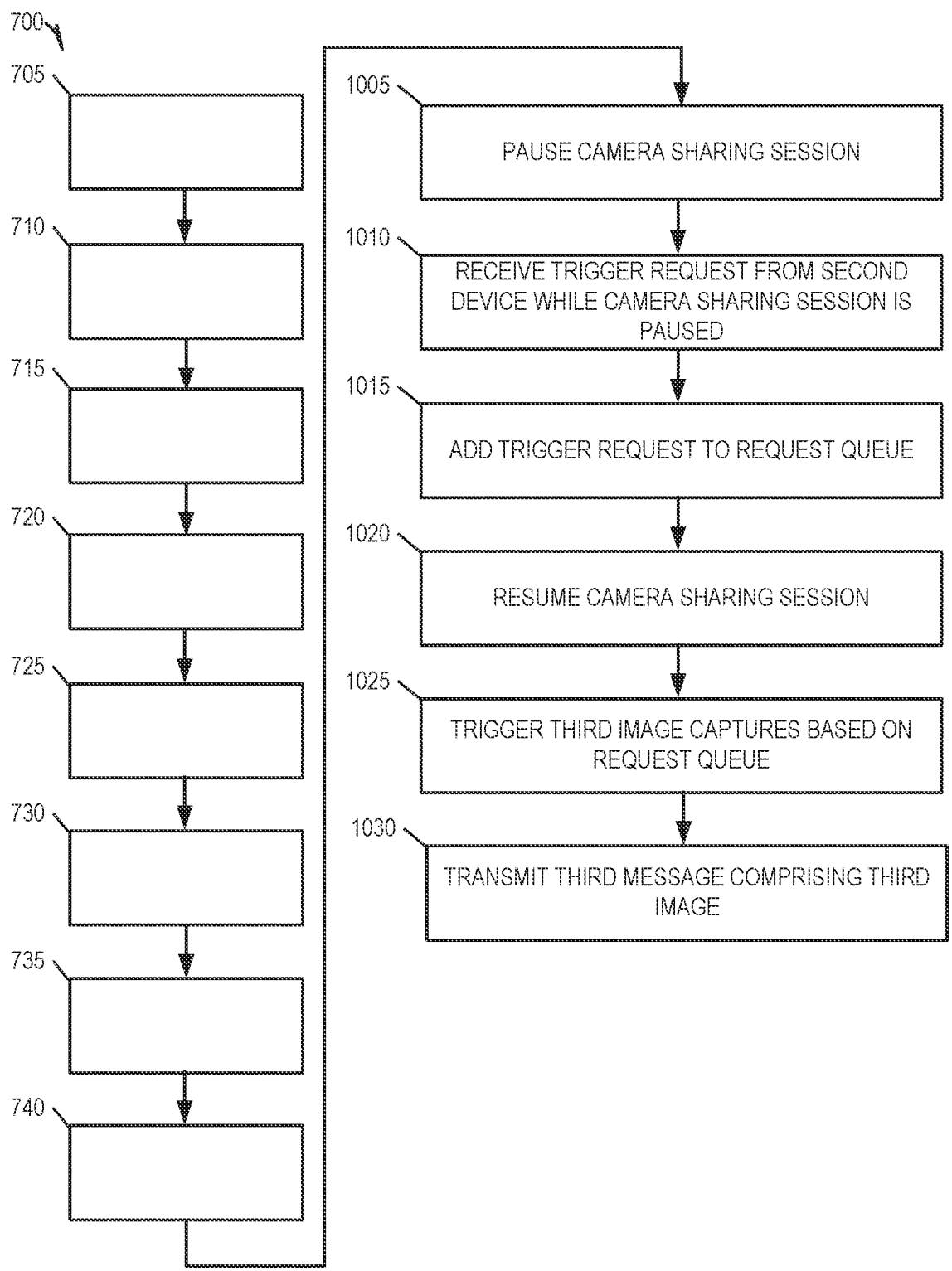

As shown in FIG. 11, the method 700 may, in some embodiments, include operations 1105, 1110, 1115, 1120, 1125, and 1130. At operation 1105, the messaging system 130 pauses the camera sharing session. The messaging system 130 may, for example, pause the camera sharing session in response to user input indicative of a request to pause the camera sharing (e.g., a press of a button mounted on the glasses 231).

At operation 1110, the messaging system 130 receives a second trigger request from the second device while the camera sharing session is paused. Based on the camera sharing session being paused, the messaging system 130 adds the second trigger request to a request queue, at operation 1115. The request queue may include one or more trigger requests to be executed once the camera sharing session resumes.

At operation 1120, the messaging system 130 resumes the camera sharing session. The messaging system 130 may resume the camera sharing in response to receiving user input indicative of a request to resume the camera sharing session.

At operation 1125, the messaging system 130 triggers a third image capture at the camera based on the request queue and in response to the camera sharing session resuming. More specifically, the messaging system 130 triggers the third image capture at the camera based on the third trigger request included in the request queue. In general, upon resuming the camera sharing session, the messaging system 130 clears the request queue by executing any trigger requests included therein. The triggering of the third image capture at the camera results in generation of third image data (e.g., comprising at least a third image).

At operation 1130, the messaging system 130 transmits a third message to the second device. The third message comprises at least the third image data. As with other messages discussed above, the third image data may be augmented based on user input with additional content such as text, emojis, graphics, and other visual effects.

Although the method 700 is described above as enabling only a second user to control image capturing at the camera 160 of the first user, it shall be appreciated that the second user may be one of a plurality of users that are enabled to control image capturing at the camera 160 of the first users.

Software Architecture

Figure 12:
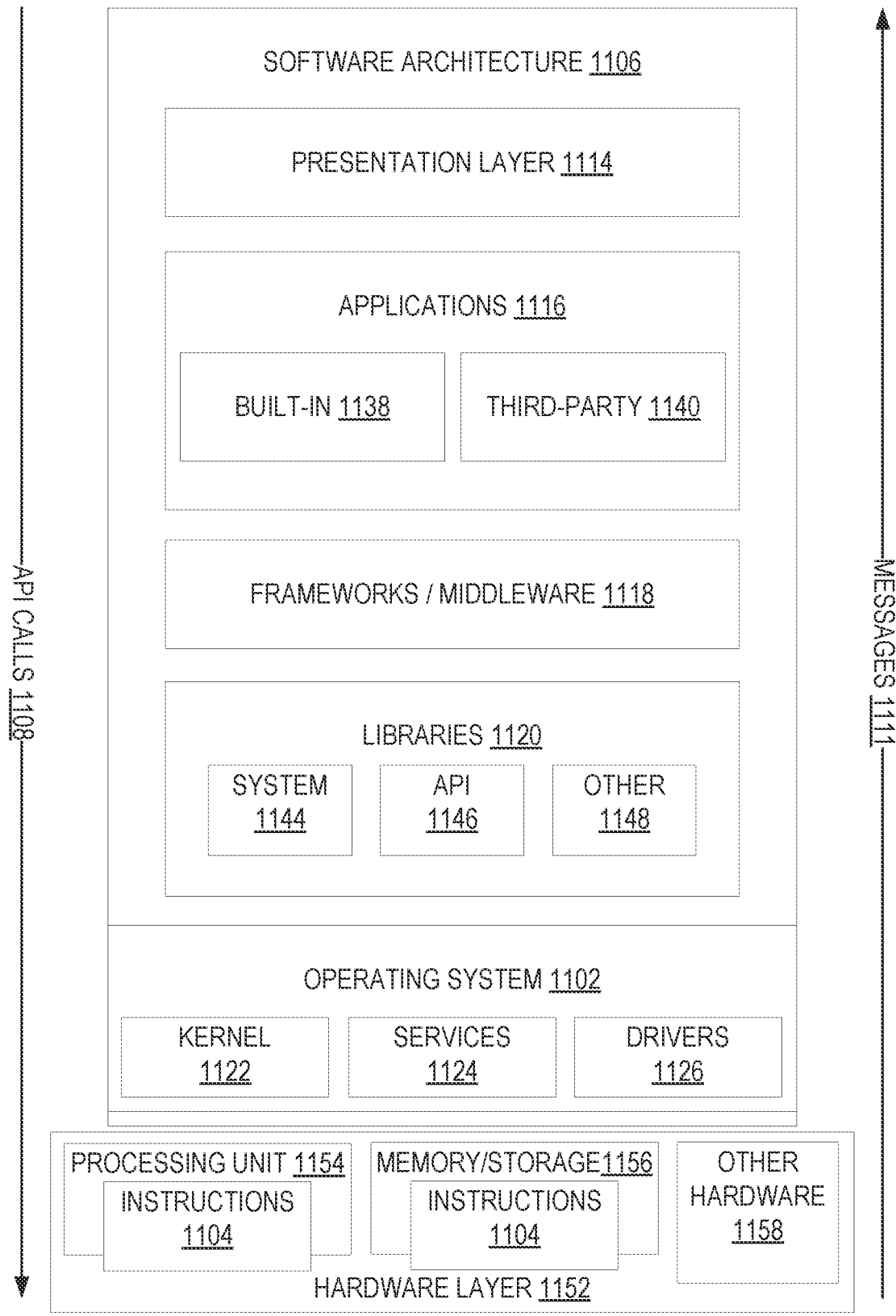
FIG. 12 is a block diagram illustrating a representative software architecture, which may be used in conjunction with various hardware architectures herein described, according to example embodiments.

FIG. 12 is a block diagram illustrating an example software architecture 1206, which may be used in conjunction with various hardware architectures herein described. FIG. 12 is a non-limiting example of a software architecture, and it will be appreciated that many other architectures may be implemented to facilitate the functionality described herein. The software architecture 1206 may execute on hardware such as a machine 1200 of FIG. 12 that includes, among other things, processors 1204, memory/storage 1206, and I/O components 1218. A representative hardware layer 1252 is illustrated and can represent, for example, the machine 1200 of FIG. 12. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes memory and/or storage modules 1256, which also have the executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke API calls 1208 through the software stack and receive a response to the API calls 1208 as messages. The layers illustrated are representative in nature and not all software architectures have all layers. For example, some mobile or special-purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 provide a higher-level common infrastructure that may be used by the applications 1216 and/or other software components/modules. For example, the frameworks/middleware 1218 may provide various GUI functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems interactions with a user may occur through a presentation layer, such as the presentation layer 1214. In these systems, the application/component "logic" can be separated from the aspects of the application/component that interact with a user.

Figure 13:
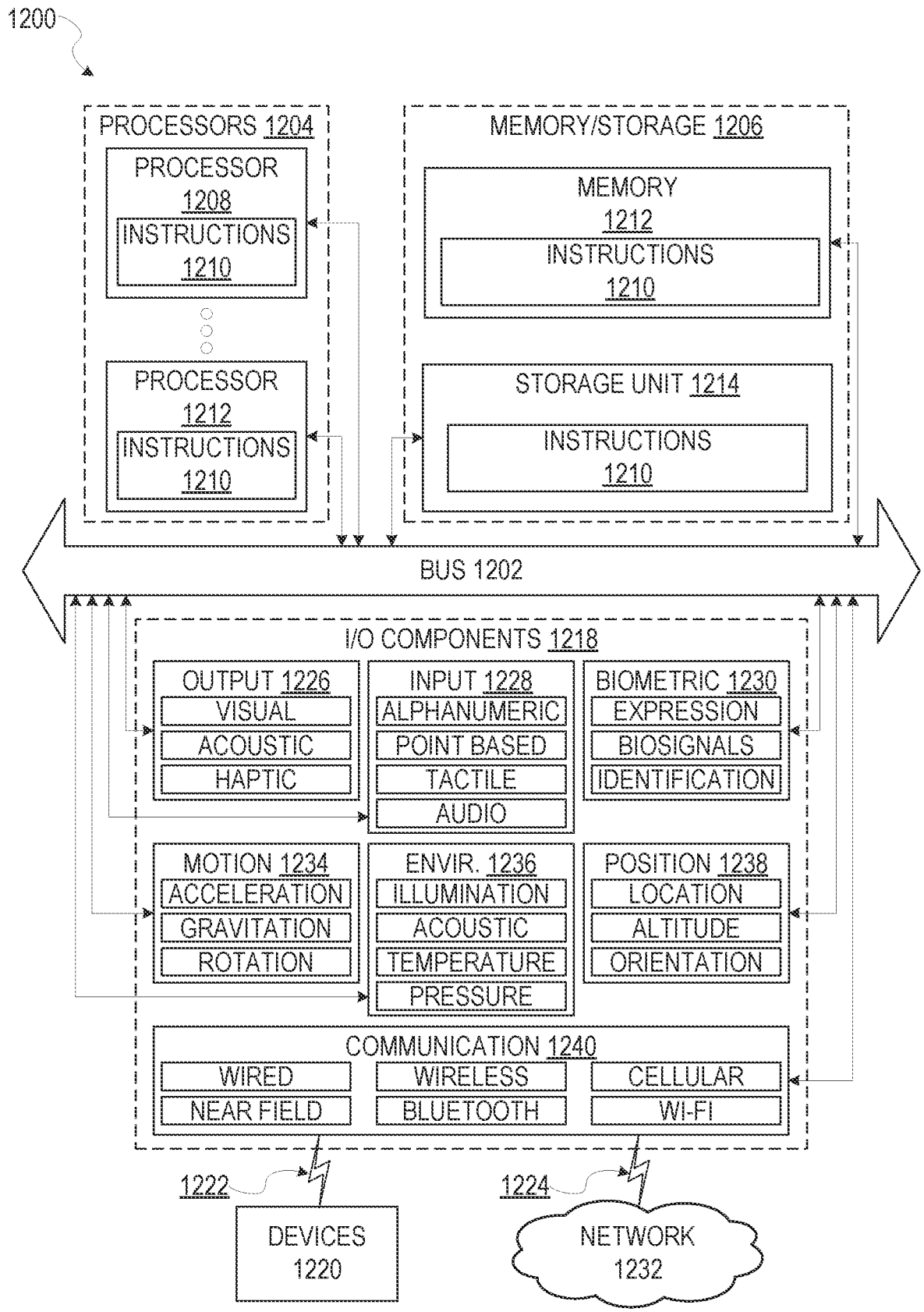
FIG. 13 is a block diagram illustrating components of a machine able to read instructions from a machine-readable medium (e.g., a machine-readable storage medium) and perform any one or more of the methodologies discussed herein, according to example embodiments.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1200 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. In an example embodiment, the processors 1304 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 1308 and a processor 1312 that may execute the instructions 1310. Although FIG. 13 shows multiple processors, the machine 1300 may include a single processor with a single core, a single processor with multiple cores (e.g., a multi-core processor), multiple processors with a single core, multiple processors with multiple cores, or any combination thereof.

The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of the processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion, and the grouping is in no way limiting. In various example embodiments, the 110 components 1318 may include output components 1326 and input components 1328. The output components 1326 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 1318 may include biometric components 1330, motion components 1334, environment components 1336, or position components 1338, among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1338 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via a coupling 1324 and a coupling 1322, respectively. For example, the communication components 1340 may include a network interface component or other suitable device to interface with the network 1332. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:

1. A method comprising:
    initiating a camera sharing session based on session configuration information, the session configuration information comprising a user identifier corresponding to a user permitted to control, during the camera sharing session, image capturing at a camera communicatively coupled to a first device, the initiating of the camera sharing session comprising transmitting, to a second device associated with the user, an invitation to join the camera sharing session, the camera being separate from the second device;
    receiving, from the second device, a trigger request;
    based on receiving the trigger request, providing a notification of a first image capture to the first device, the notification including a request for authorization of the first image capture;
    in response to detecting the authorization, detecting authorization of the first image capture by the first device;
    in response to detecting the authorization, triggering the first image capture at the camera, the first image capture resulting in first image data comprising a first image; and
    transmitting, to the second device, a first message comprising the first image data.

2. The method of claim 1, further comprising:
    prior to receiving the trigger request and based on an indication of the user joining the camera sharing session, triggering a second image capture at the camera, the second image capture resulting in second image data comprising a second image; and
    transmitting, to the second device, a second message comprising the second image data.

3. The method of claim 1, further comprising:
    receiving, from the first device, the session configuration information via a user interface provided to the first device.

4. The method of claim 1, wherein the initiating of the camera sharing session further comprises:
    activating the camera that is communicatively coupled to the first device, the camera to generate one or more images upon being activated; and
    capturing, in response to first user input, second image data comprising a second image captured by the camera;
    wherein the invitation comprises the second image data.

5. The method of claim 4, wherein:
    the camera sharing session configuration information further comprises a user-generated textual description associated with the camera sharing session; and
    the invitation includes the user-generated textual description associated with the camera sharing session.

6. The method of claim 3, further comprising:
    capturing, in response to second user input, third image data comprising a third image at the camera; and
    providing access to the third image data to the second device.

7. The method of claim 1, wherein:
    the trigger request is a first trigger request; and
    the method further comprises:
        receiving, from the second device, a second trigger request while the camera sharing session is paused; and
        based on the camera sharing session being paused, adding the second trigger request to a request queue.

8. The method of claim 7, further comprising:
    upon resuming the camera sharing session, triggering a second image capture at the camera based on the request queue, the second image capture resulting in second image data; and
    transmitting, to the second device, a second message comprising the second image data.

9. The method of claim 1, wherein:
    the user is a first user;
    the camera is embedded in a wearable device worn by a second user associated with the first device; and
    the wearable device is communicatively coupled to the first device.

10. The method of claim 1, wherein:
    the user is a first user;
    the camera is embedded in the first device; and
    the first device is associated with a second user.

11. A system comprising:
    one or more processors of a server machine; and
    a computer-readable memory coupled to the one or more processors and storing instructions that, when executed by the one or more processors, cause the server machine to perform operations comprising:
    initiating a camera sharing session based on session configuration information, the session configuration information comprising a user identifier corresponding to a user permitted to control, during the camera sharing session, image capturing at a camera communicatively coupled to a first device, the initiating of the camera sharing session comprising transmitting, to a second device associated with the user, an invitation to join the camera sharing session, the camera being separate from the second device;
    receiving, from the second device, a trigger request;
    based on receiving the trigger request, providing a notification of a first image capture to the first device, the notification including a request for authorization of the first image capture;
    in response to detecting the authorization, detecting authorization of the first image capture by the first device;
    in response to detecting the authorization, triggering the first image capture at the camera, the first image capture resulting in first image data comprising a first image; and
    transmitting, to the second device, a first message comprising the first image data.

12. The system of claim 11, wherein the initiating of the camera sharing session further comprises:
    activating the camera that is communicatively coupled to the first device, the camera to generate one or more images upon being activated;
    capturing, in response to first user input by a user of the first device, a third image captured by the camera; and
    transmitting, to the second device associated with the user, an invitation to join the camera sharing session, the invitation comprises third image.

13. The system of claim 11, wherein:
the trigger request is a first trigger request; and
the operations further comprise:
- receiving, from the second device, a second trigger request while the camera sharing session is paused; and
- based on the camera sharing session being paused, adding the second trigger request to a request queue.

14. The system of claim 13, wherein the operations further comprise:
- upon resuming the camera sharing session, triggering a third image capture at the camera based on the request queue, the third image capture resulting in third image data comprising at least a third image; and
- transmitting, to the second device, a third message comprising the third image data.

15. The system of claim 11, wherein the operations further comprise:
- in response to receiving user input, generating a third message comprising a third image captured by the camera; and
- transmitting, to the second device, the third message comprising the third image.

16. The system of claim 11, wherein:
the camera is embedded in a wearable device worn by a user of the first device; and
the wearable device is communicatively coupled to the first device.

17. A non-transitory computer-readable medium storing instructions that, when executed by a computer system, cause the computer system to perform operations comprising:
- initiating a camera sharing session based on session configuration information, the session configuration information comprising a user identifier corresponding to a user permitted to control, during the camera sharing session, image capturing at a camera communicatively coupled to a first device, the initiating of the camera sharing session comprising transmitting, to a second device associated with the user, an invitation to join the camera sharing session, the camera being separate from the second device;
- receiving, from the second device, a trigger request;
- based on receiving the trigger request, providing a notification of a first image capture to the first device, the notification including a request for authorization of the first image capture;
- in response to detecting the authorization, detecting authorization of the first image capture by the first device;
- in response to detecting the authorization, triggering the first image capture at the camera, the first image capture resulting in first image data comprising a first image; and
- transmitting, to the second device, a first message comprising the first image data.

18. The non-transitory computer-readable medium of claim 17, wherein the initiating of the camera sharing session further comprises:
- activating the camera that is communicatively coupled to the first device, the camera to generate one or more images upon being activated;
- capturing, in response to first user input by a user of the first device, a third image captured by the camera; and
- transmitting, to the second device associated with the user, an invitation to join the camera sharing session, the invitation comprises third image.

19. The non-transitory computer-readable medium of claim 17, wherein:
the trigger request is a first trigger request; and
the operations further comprise:
- receiving, from the second device, a second trigger request while the camera sharing session is paused; and
- based on the camera sharing session being paused, adding the second trigger request to a request queue.

20. The non-transitory computer-readable medium of claim 19, wherein the operations further comprise:
- upon resuming the camera sharing session, triggering a third image capture at the camera based on the request queue, the third image capture resulting in third image data comprising at least a third image; and
- transmitting, to the second device, a third message comprising the third image data.

* * * * *